(12) United States Patent
Pescianschi

(10) Patent No.: US 9,619,749 B2
(45) Date of Patent: *Apr. 11, 2017

(54) NEURAL NETWORK AND METHOD OF NEURAL NETWORK TRAINING

(71) Applicant: Progress, Inc., West Bloomfield, MI (US)

(72) Inventor: Dmitri Pescianschi, Darmstadt (DE)

(73) Assignee: Progress, Inc., West Bloomfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,137

(22) Filed: Jun. 9, 2016

(65) Prior Publication Data

US 2016/0283842 A1 Sep. 29, 2016

Related U.S. Application Data

(63) Continuation-in-part of application No. 14/862,337, filed on Sep. 23, 2015, now Pat. No. 9,390,373, and a continuation of application No. PCT/US2015/019236, filed on Mar. 6, 2015.

(60) Provisional application No. 61/949,210, filed on Mar. 6, 2014, provisional application No. 62/106,389, filed on Jan. 22, 2015, provisional application No. 62/173,163, filed on Jun. 9, 2015.

(51) Int. Cl.
*G06N 3/08* (2006.01)
*G06N 3/04* (2006.01)
*G06N 3/063* (2006.01)

(52) U.S. Cl.
CPC .............. *G06N 3/084* (2013.01); *G06N 3/04* (2013.01); *G06N 3/0635* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 4,918,618 A | 4/1990 | Tomlinson | |
| 4,979,124 A | 12/1990 | Sachse et al. | |
| 5,253,329 A | 10/1993 | Villarreal | |
| 5,299,285 A | 3/1994 | Tawel | |
| 5,479,575 A | 12/1995 | Yoda | |
| 5,493,688 A | 2/1996 | Weingard | |
| 5,566,273 A | 10/1996 | Huang et al. | |

(Continued)

*Primary Examiner* — Kakali Chaki
*Assistant Examiner* — Michael Zidanic
(74) *Attorney, Agent, or Firm* — Quinn IP Law

(57) ABSTRACT

A neural network includes a plurality of inputs for receiving input signals, and synapses connected to the inputs and having corrective weights established by a memory element that retains a respective weight value. The network additionally includes distributors. Each distributor is connected to one of the inputs for receiving the respective input signal and selects one or more corrective weights in correlation with the input value. The network also includes neurons. Each neuron has an output connected with at least one of the inputs via one synapse and generates a neuron sum by summing corrective weights selected from each synapse connected to the respective neuron. The output of each neuron provides the respective neuron sum to establish operational output signal of the network. A method of operating a neural network includes processing data thereby and using modified corrective weight values established by a separate analogous neural network during training thereof.

20 Claims, 17 Drawing Sheets

(56) References Cited

U.S. PATENT DOCUMENTS

| | | |
|---|---|---|
| 5,671,337 A | 9/1997 | Yoshihara |
| 5,682,503 A | 10/1997 | Yoda |
| 5,870,729 A | 2/1999 | Yoda |
| 7,577,631 B2 | 8/2009 | Feldhake |
| 7,814,038 B1 | 10/2010 | Repici |
| 7,904,398 B1 | 3/2011 | Repici |
| 2010/0088263 A1 | 4/2010 | Deco et al. |
| 2012/0166374 A1 | 6/2012 | Moussa et al. |

NEURAL NETWORK AND METHOD OF NEURAL NETWORK TRAINING

CROSS-REFERENCE TO RELATED APPLICATION(S)

This application is a continuation in part of U.S. Utility application Ser. No. 14/862,337 which is a continuation of International Application Serial No. PCT/US 2015/19236, which claims the benefit of U.S. Provisional Application Ser. No. 61/949,210 filed Mar. 6, 2014, and U.S. Provisional Application Ser. No. 62/106,389 filed Jan. 22, 2015, the entire content of which is hereby incorporated by reference. This application also claims the benefit of U.S. Provisional Application Ser. No. 62/173,163 filed Jun. 9, 2015, the entire content of which is similarly incorporated by reference.

TECHNICAL FIELD

The disclosure relates to an artificial neural network and a method of training the same.

BACKGROUND

In machine learning, the term "neural network" generally refers to software and/or computer architecture, i.e., the overall design or structure of a computer system or a microprocessor, including the hardware and software required to run it. Artificial neural networks can be a family of statistical learning algorithms inspired by biological neural networks, a.k.a., the central nervous systems of animals, in particular the brain. Artificial neural networks are primarily used to estimate or approximate generally unknown functions that can depend on a large number of inputs. Such neural networks have been used for a wide variety of tasks that are difficult to resolve using ordinary rule-based programming, including computer vision and speech recognition.

Artificial neural networks are generally presented as systems of "neurons" which can compute values from inputs, and, as a result of their adaptive nature, are capable of machine learning, as well as pattern recognition. Each neuron frequently connects with several inputs through synapses having synaptic weights.

Neural networks are not programmed as typical software and hardware, but are trained. Such training is typically accomplished via analysis of a sufficient number of representative examples and by statistical or algorithmic selection of synaptic weights, so that a given set of input images corresponds to a given set of output images. A common criticism of classical neural networks is that significant time and other resources are frequently required for their training.

Various artificial neural networks are described in the following U.S. Pat. Nos. 4,979,124; 5,479,575; 5,493,688; 5,566,273; 5,682,503; 5,870,729; 7,577,631; and 7,814,038.

SUMMARY

A neural network includes a plurality of network inputs, such that each input is configured to receive an input signal having an input value. The neural network also includes a plurality of synapses, wherein each synapse is connected to one of the plurality of inputs and includes a plurality of corrective weights, wherein each corrective weight is established by a memory element that retains a respective weight value. The neural network additionally includes a set of distributors. Each distributor is operatively connected to one of the plurality of inputs for receiving the respective input signal and is configured to select one or more corrective weights from the plurality of corrective weights in correlation with the input value. The neural network also includes a set of neurons. Each neuron has at least one output and is connected with at least one of the plurality of inputs via one of the plurality of synapses synapse and is configured to add up the weight values of the corrective weights selected from each synapse connected to the respective neuron and thereby generate a neuron sum. The output of each neuron provides the respective neuron sum to establish an operational output signal of the neural network.

The neural network may also include a weight correction calculator configured to receive a desired output signal having a value, determine a deviation of the neuron sum from the desired output signal value, and modify respective corrective weight values established by the corresponding memory elements using the determined deviation. In such a case, adding up the modified corrective weight values to determine the neuron sum is intended to minimize the deviation of the neuron sum from the desired output signal value to thereby generate a trained neural network.

The trained neural network can be configured to receive supplementary training using solely a supplementary input signal having a value and a corresponding supplementary desired output signal.

Either during training or before the supplementary training of the neural network, each of the plurality of synapses can be configured to accept one or more additional corrective weights established by the respective memory elements.

The neural network can be configured to remove from the respective synapses, during or after training of the neural network, one or more corrective weights established by the respective memory elements. Such removal of some corrective weights can permit the neural network to retain only a number of memory elements required to operate the neural network.

The neural network can be configured to accept at least one of an additional input, an additional synapse, and an additional neuron before or during training of the neural network to thereby expand operational parameters of the neural network.

The neural network can be configured to remove at least one of an input, a synapse, and a neuron before, during, or after training of the neural network. Such ability to remove neural network elements that are not being used by the network is intended to simplify structure and modify operational parameters of the neural network without loss of the network's output quality.

Each memory element can be established by an electrical device characterized by an electrical and/or a magnetic characteristic configured to define a respective weight value. Such a characteristic can be resistance, impedance, capacity, magnetic field, induction, electric field intensity, etc. The respective electrical and/or magnetic characteristic of each device can be configured to be varied during training of the neural network. Additionally, the weight correction calculator can modify the respective corrective weight values by varying the respective at least one of the electrical and the magnetic characteristic of the corresponding electrical devices.

The electrical device can be configured as one of a resistor, a memistor, a memristor, a transistor, a capacitor, a field-effect transistor, a photoresistor, such as a light-dependent resistor (LDR), or a magnetic dependent resistor (MDR).

Each memory element can be established by a block of electrical resistors and include a selector device configured to select one or more electrical resistors from the block using the determined deviation to establish each corrective weight.

The block of electrical resistors can additionally include electrical capacitors. In other words, each memory element can be established by a block having both, electrical resistors and electrical capacitors. The selector device can then be additionally configured to select capacitors using the determined deviation to establish each corrective weight.

The neural network can be configured as one of an analog, digital, and digital-analog network. In such a network, at least one of the plurality of inputs, the plurality of synapses, the memory elements, the set of distributors, the set of neurons, the weight correction calculator, and the desired output signal can be configured to operate in an analog, digital, and digital-analog format.

In the case where the neural network is configured as the analog network, each neuron can be established by one of a series and a parallel communication channel, such as an electrical wire, or a series or parallel bus.

The weight correction calculator can be established as a set of differential amplifiers. Furthermore, each differential amplifier can be configured to generate a respective correction signal.

Each of the distributors can be a demultiplexer configured to select one or more corrective weights from the plurality of corrective weights in response to the received input signal.

Each distributor can be configured to convert the received input signal into a binary code and select one or more corrective weights from the plurality of corrective weights in correlation with the binary code.

The neural network can be programmed into an electronic device having a memory, and wherein each memory element is stored in the memory of the electronic device.

A method of operating a utility neural network is also disclosed. The method includes processing data via the utility neural network using modified corrective weight values established by a separate analogous neural network during training thereof. The method also includes establishing an operational output signal of the utility neural network using the modified corrective weight values established by the separate analogous neural network.

For use of modified corrective weight values by the utility neural network, the separate analogous neural network was trained via receiving, via an input to the neural network, a training input signal having a training input value; communicating the training input signal to a distributor operatively connected to the input; selecting, via the distributor, in correlation with the training input value, one or more corrective weights from a plurality of corrective weights, wherein each corrective weight is defined by a weight value and is positioned on a synapse connected to the input; adding up the weight values of the selected corrective weights, via a neuron connected with the input via the synapse and having at least one output, to generate a neuron sum; receiving, via a weight correction calculator, a desired output signal having a value; determining, via the weight correction calculator, a deviation of the neuron sum from the desired output signal value; and modifying, via the weight correction calculator, respective corrective weight values using the determined deviation to establish the modified corrective weight values, such that adding up the modified corrective weight values to determine the neuron sum minimizes the deviation of the neuron sum from the desired output signal value to thereby train the neural network.

The utility neural network and the trained separate analogous neural network can include a matching neural network structure including a number of inputs, corrective weights, distributors, neurons, and synapses.

In each of the utility neural network and the trained separate analogous neural network, each corrective weight can be established by a memory element that retains a respective weight value.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
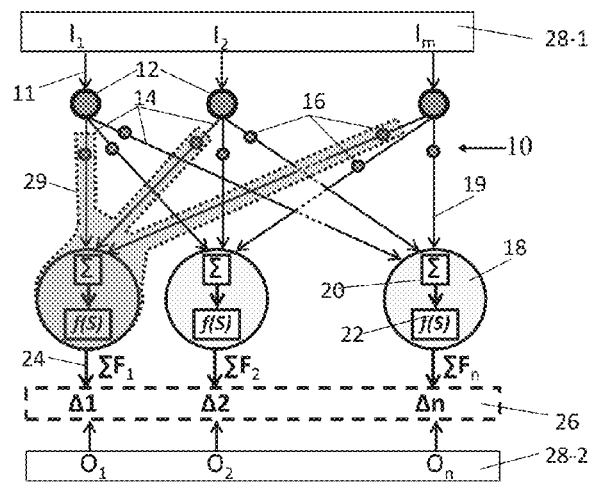
FIG. 1 is a schematic illustration of a prior art, classical artificial neural network.

A classical artificial neural network 10, as shown in FIG. 1, typically includes input devices 12, synapses 14 with synaptic weights 16, neurons 18, including an adder 20 and activation function device 22, neuron outputs 24 and weight correction calculator 26. Each neuron 18 is connected through synapses 14 to two or more input devices 12. The values of synaptic weights 16 are commonly represented using electrical resistance, conductivity, voltage, electric charge, magnetic property, or other parameters.

Supervised training of the classical neural network 10 is generally based on an application of a set of training pairs 28. Each training pair 28 commonly consists of an input image 28-1 and a desired output image 28-2, a.k.a., a supervisory signal. Training of the classical neural network 10 is typically provided as follows. An input image in the form of a set of input signals ($I_1$-$I_m$) enters the input devices 12 and is transferred to the synaptic weights 16 with initial weights ($W_1$). The value of the input signal is modified by the weights, typically by multiplying or dividing each signal ($I_1$-$I_m$) value by the respective weight. From the synaptic weights 16, modified input signals are transferred either to the respective neurons 18. Each neuron 18 receives a set of signals from a group of synapses 14 related to the subject neuron 18. The adder 20 included in the neuron 18 sums up all the input signals modified by the weights and received by the subject neuron. Activation function devices 22 receive the respective resultant neuron sums and modify the sums according to mathematical function(s), thus forming respective output images as sets of neuron output signals ($\Sigma F_1 \ldots F_n$).

The obtained neuron output image defined by the neuron output signals ($\Sigma F_1 \ldots \Sigma F_n$) is compared by a weight correction calculator 26 with pre-determined desired output images ($O_1$-$O_n$). Based on the determined difference between the obtained neuron output image $\Sigma F_n$ and the desired output image $O_n$, correction signals for changing the synaptic weights 16 are formed using a pre-programmed algorithm. After corrections are made to all the synaptic weights 16, the set of input signals is reintroduced to the neural network 10 and new corrections are made. The above cycle is repeated until the difference between the obtained neuron output image ($I_1$-$I_m$) and the desired output image $O_n$ is determined to be less than some predetermined error. One cycle of network training with all the individual images is typically identified as a "training epoch". Generally, with each training epoch, the magnitude of error is reduced. However, depending on the number of individual inputs ($I_1$-$I_m$), as well as the number of inputs and outputs, training of the classical neural network 10 may require a significant number of training epochs, which, in some cases, may be as great as hundreds of thousands.

A variety of classical neural networks exist, including Hopfield network, Restricted Boltzmann Machine, Radial basis function network, and recurrent neural network. Specific tasks of classification and clustering require a specific type of neural network, the Self-Organizing Maps that use only input images as network input training information, whereas the desired output image, corresponding to a certain input image is formed directly during the training process based on a single winning neuron having an output signal with the maximum value.

As noted above, one of the main concerns with existing, classical neural networks, such as the neural network 10, is that successful training thereof may require a significant duration of time. Some additional concerns with classical networks may be a large consumption of computing resources, which would in turn drive the need for powerful computers. Additional concerns are an inability to increase the size of the network without full retraining of the network, a predisposition to such phenomena as "network paralysis" and "freezing at a local minimum", which make it impossible to predict if a specific neural network would be capable of being trained with a given set of images in a given sequence. Also there may be limitations related to specific sequencing of images being introduced during training, where changing the order of introduction of training images may lead to network freezes, as well as an inability to perform additional training of an already trained network.

Figure 2:
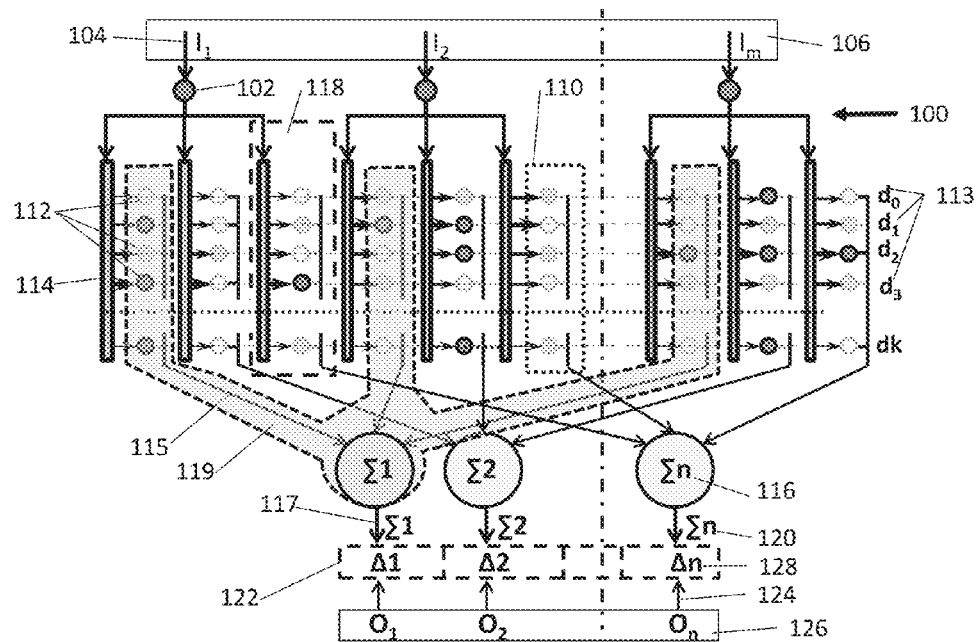
FIG. 2 is a schematic illustration of a "progressive neural network" (p-net) having a plurality of synapses, a set of distributors, and a plurality of corrective weights associated with each synapse.

Referring to the remaining drawings, wherein like reference numbers refer to like components, FIG. 2 shows a schematic view of a progressive neural network, thereafter "progressive network", or "p-net" 100. The p-net 100 includes a plurality or a set of inputs 102 of the p-net. Each input 102 is configured to receive an input signal 104, wherein the input signals are represented as $I_1, I_2 \ldots I_m$ in FIG. 2. Each input signal $I_1, I_2 \ldots I_m$ represents a value of some characteristic(s) of an input image 106, for example, a magnitude, frequency, phase, signal polarization angle, or association with different parts of the input image 106. Each input signal 104 has an input value, wherein together the plurality of input signals 104 generally describes the input image 106.

Each input value may be within a value range that lies between $-\infty$ and $+\infty$ and can be set in digital and/or analog forms. The range of the input values may depend on a set of training images. In the simplest case, the range input values could be the difference between the smallest and largest values of input signals for all training images. For practical reasons, the range of the input values may be limited by eliminating input values that are deemed too high. For example, such limiting of the range of the input values may be accomplished via known statistical methods for variance reduction, such as importance sampling. Another example of limiting the range of the input values may be designation of all signals that are lower than a predetermined minimum level to a specific minimum value and designation of all signals exceeding a predetermined maximum level to a specific maximum value.

The p-net 100 also includes a plurality or a set of synapses 118. Each synapse 118 is connected to one of the plurality of inputs 102, includes a plurality of corrective weights 112, and may also include a synaptic weight 108, as shown in FIG. 2. Each corrective weight 112 is defined by a respective weight value. The p-net 100 also includes a set of distributors 114. Each distributor 114 is operatively connected to one of the plurality of inputs 102 for receiving the respective input signal 104. Additionally, each distributor 114 is configured to select one or more corrective weights from the plurality of corrective weights 112 in correlation with the input value.

Figure 3A:
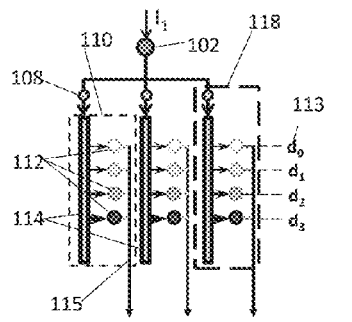
FIG. 3A is a schematic illustration of a portion of the p-net shown in FIG. 2, having a plurality of synapses and one synaptic weight positioned upstream of each distributor.
Figure 3C:
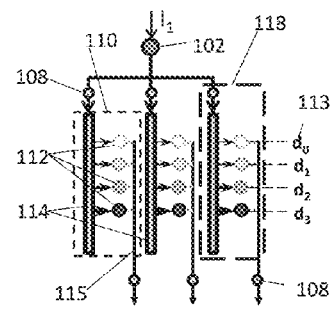
FIG. 3C is a schematic illustration of a portion of the p-net shown in FIG. 2, having a plurality of synapses and one synaptic weight positioned upstream of each distributor and a set of synaptic weights positioned downstream of the respective plurality of corrective weights.
Figure 3B:
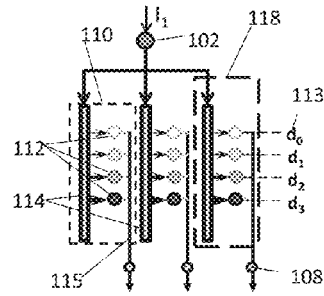
FIG. 3B is a schematic illustration of a portion of the p-net shown in FIG. 2, having a plurality of synapses and a set of synaptic weights positioned downstream of the respective plurality of corrective weights.
Figure 4A:
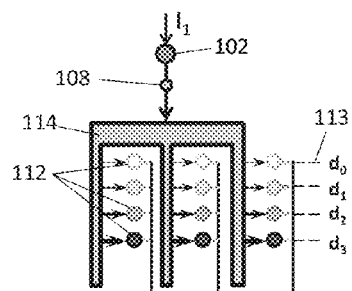
FIG. 4A is a schematic illustration of a portion of the p-net shown in FIG. 2, having a single distributor for all synapses of a given input and one synaptic weight positioned upstream of each distributor.
Figure 4C:
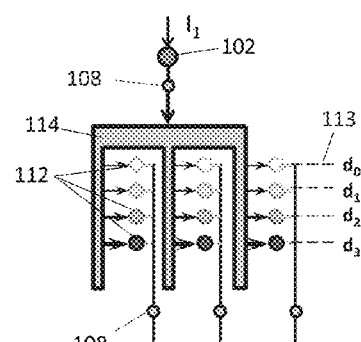
FIG. 4C is a schematic illustration of a portion of the p-net shown in FIG. 2, having a single distributor for all synapses of a given input, and having one synaptic weight positioned upstream of each distributor and a set of synaptic weights positioned downstream of the respective plurality of corrective weights.
Figure 4B:
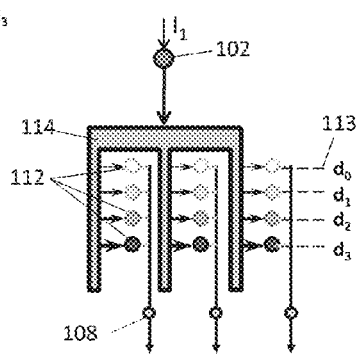
FIG. 4B is a schematic illustration of a portion of the p-net shown in FIG. 2, having a single distributor for all synapses of a given input and a set of synaptic weights positioned downstream of the respective plurality of corrective weights.

The p-net 100 additionally includes a set of neurons 116. Each neuron 116 has at least one output 117 and is connected with at least one of the plurality of inputs 102 via one synapse 118. Each neuron 116 is configured to add up or sum the corrective weight values of the corrective weights 112 selected from each synapse 118 connected to the respective neuron 116 and thereby generate and output a neuron sum 120, otherwise designated as $\Sigma n$. A separate distributor 114 can be used for each synapse 118 of a given input 102, as shown in FIGS. 3A, 3B, and 3C, or a single distributor can be used for all such synapses, as shown in FIGS. 4A, 4B, and 4C. During formation or setup of the p-net 100, all corrective weights 112 are assigned initial values, which can change during the process of p-net training. The initial value of the corrective weight 112 may be assigned as in the classical neural network 10, for example, the weights may be selected randomly, calculated with the help of a pre-determined mathematical function, selected from a predetermined template, etc.

The p-net 100 also includes a weight correction calculator 122. The weight correction calculator 122 is configured to receive a desired, i.e., predetermined, output signal 124 having a signal value and representing a portion of an output image 126. The weight correction calculator 122 is also configured to determine a deviation 128 of the neuron sum 120 from the value of the desired output signal 124, a.k.a., training error, and modify respective corrective weight values using the determined deviation 128. Thereafter, summing the modified corrective weight values to determine the neuron sum 120 minimizes the deviation of the subject neuron sum from the value of the desired output signal 124 and, as a result, is effective for training the p-net 100.

For analogy with the classical network 10 discussed with respect to FIG. 1, the deviation 128 may also be described as the training error between the determined neuron sum 120 and the value of the desired output signal 124. In comparison with the classical neural network 10 discussed with respect to FIG. 1, in the p-net 100 the input values of the input signal 104 only change in the process of general network setup, and are not changed during training of the p-net. Instead of changing the input value, training of the p-net 100 is provided by changing the values 112 of the corrective weights 112. Additionally, although each neuron 116 includes a summing function, where the neuron adds up the corrective weight values, the neuron 116 does not require, and, in fact, is characterized by absence of an activation function, such as provided by the activation function device 22 in the classical neural network 10.

In the classical neural network 10, weight correction during training is accomplished by changing synaptic weights 16, while in the p-net 100 corresponding weight correction is provided by changing corrective weights values 112, as shown in FIG. 2. The respective corrective weights 112 may be included in weight correction blocks 110 positioned on all or some of the synapses 118. In neural network computer emulations, each synaptic and corrective weight may be represented either by a digital device, such as a memory cell, and/or by an analog device. In neural network software emulations, the values of the corrective weights 112 may be provided via an appropriate programmed algorithm, while in hardware emulations, known methods for memory control could be used.

In the p-net 100, the deviation 128 of the neuron sum 120 from the desired output signal 124 may be represented as a mathematically computed difference therebetween. Additionally, the generation of the respective modified corrective weights 112 may include apportionment of the computed difference to each corrective weight used to generate the neuron sum 120. In such an embodiment, the generation of the respective modified corrective weights 112 will permit the neuron sum 120 to be converged on the desired output signal value within a small number of epochs, in some cases needing only a single epoch, to rapidly train the p-net 100. In a specific case, the apportionment of the mathematical difference among the corrective weights 112 used to generate the neuron sum 120 may include dividing the determined difference equally between each corrective weight used to generate the respective neuron sum 120.

In a separate embodiment, the determination of the deviation 128 of the neuron sum 120 from the desired output signal value may include division of the desired output signal value by the neuron sum to thereby generate a deviation coefficient. In such a specific case, the modification of the respective modified corrective weights 112 includes multiplication of each corrective weight used to generate the neuron sum 120 by the deviation coefficient. Each distributor 114 may additionally be configured to assign a plurality of coefficients of impact 134 to the plurality of corrective weights 112. In the present embodiment, each coefficient of impact 134 may be assigned to one of the plurality of corrective weights 112 in some predetermined proportion to generate the respective neuron sum 120. For correspondence with each respective corrective weight 112, each coefficient of impact 134 may be assigned a "$C_{i,d,n}$" nomenclature, as shown in the Figures.

Each of the plurality of coefficients of impact 134 corresponding to the specific synapse 118 is defined by a respective impact distribution function 136. The impact distribution function 136 may be same either for all coefficients of impact 134 or only for the plurality of coefficients of impact 134 corresponding a specific synapse 118. Each of the plurality of input values may be received into a value range 138 divided into intervals or sub-divisions "d" according to an interval distribution function 140, such that each input value is received within a respective interval "d" and each corrective weight corresponds to one of such intervals. Each distributor 114 may use the respective received input value to select the respective interval "d", and to assign the respective plurality of coefficients of impact 134 to the corrective weight 112 corresponding to the selected respective interval "d" and to at least one corrective weight corresponding to an interval adjacent to the selected respective interval, such as $W_{i,d+1,n}$ or $W_{i,d-1,n}$. In another nonlimiting example, the predetermined proportion of the coefficients of impact 134 may be defined according to a statistical distribution.

Generating the neuron sum 120 may include initially assigning respective coefficients of impact 134 to each corrective weight 112 according to the input value 102 and then multiplying the subject coefficients of impact by values of the respective employed corrective weights 112. Then, summing via the each neuron 116 the individual products of the corrective weight 112 and the assigned coefficient of impact 134 for all the synapses 118 connected thereto.

The weight correction calculator 122 may be configured to apply the respective coefficients of impact 134 to generate the respective modified corrective weights 112. Specifically, the weight correction calculator 122 may apply a portion of the computed mathematical difference between the neuron sum 120 and the desired output signal 124 to each corrective weight 112 used to generate the neuron sum 120 according to the proportion established by the respective coefficients of impact 134. Additionally, the mathematical difference divided among the corrective weights 112 used to generate the neuron sum 120 can be further divided by the respective coefficient of impact 134. Subsequently, the result of the division of the neuron sum 120 by the respective coefficient of impact 134 can be added to the corrective weight 112 in order to converge the neuron sum 120 on the desired output signal value.

Typically formation of the p-net 100 will take place before the training of the p-net commences. However, in a separate embodiment, if during training the p-net 100 receives an input signal 104 for which initial corrective weights are absent, appropriate corrective weights 112 may be generated. In such a case, the specific distributor 114 will determine the appropriate interval "d" for the particular input signal 104, and a group of corrective weights 112 with initial values will be generated for the given input 102, the given interval "d", and all the respective neurons 116. Additionally, a corresponding coefficient of impact 134 can be assigned to each newly generated corrective weight 112.

Each corrective weight 112 may be defined by a set of indexes configured to identify a position of each respective corrective weight on the p-net 100. The set of indexes may specifically include an input index "i" configured to identify the corrective weight 112 corresponding to the specific input 102, an interval index "d" configured to specify the discussed-above selected interval for the respective corrective weight, and a neuron index "n" configured to specify the corrective weight 112 corresponding to the specific neuron 116 with nomenclature "$W_{i,d,n}$". Thus, each corrective weight 112 corresponding to a specific input 102 is assigned the specific index "i" in the subscript to denote the subject position. Similarly, each corrective weight "W" corresponding to a specific neuron 116 and a respective synapse 118 is assigned the specific indexes "n" and "d" in the subscript to denote the subject position of the corrective weight on the p-net 100. The set of indexes may also include an access index "a" configured to tally a number of times the respective corrective weight 112 is accessed by the input signal 104 during training of the p-net 100. In other words, each time a specific interval "d" and the respective corrective weight 112 is selected for training from the plurality of corrective weights in correlation with the input value, the access index "a" is incremented to count the input signal. The access index "a" may be used to further specify or define a present status of each corrective weight by adopting a nomenclature "$W_{i,d,n,a}$". Each of the indexes "i", "d", "n", and "a" can be numerical values in the range of 0 to +∞.

Figure 5:
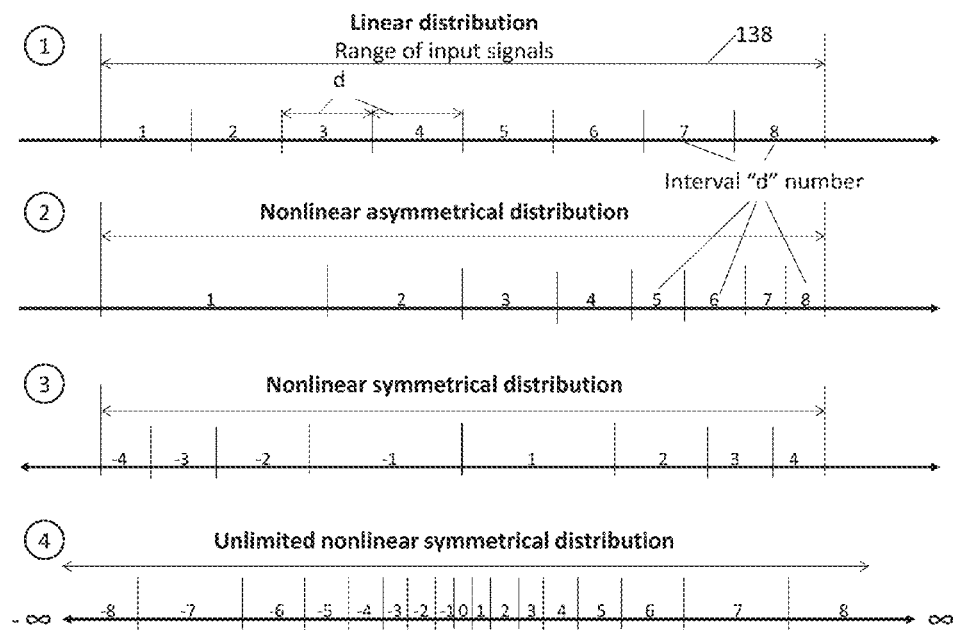
FIG. 5 is a schematic illustration of division of input signal value range into individual intervals in the p-net shown in FIG. 2.

Various possibilities of dividing the range of input signals 104 into intervals $d_0$, $d_1$ ... $d_m$ are shown in FIG. 5. The specific interval distribution can be uniform or linear, which, for example, can be achieved by specifying all intervals "d" with the same size. All input signals 104 having their respective input signal value lower than a predetermined lowest level can be considered to have zero value, while all input signals having their respective input signal value greater than a predetermined highest level can be assigned to such highest level, as also shown in FIG. 5. The specific interval distribution can also be non-uniform or nonlinear, such as symmetrical, asymmetrical, or unlimited. Nonlinear distribution of intervals "d" may be useful when the range of the input signals 104 is considered to be impractically large, and a certain part of the range could include input signals considered to be most critical, such as in the beginning, in the middle, or at end of the range. The specific interval distribution can also be described by a random function. All the preceding examples are of the non-limiting nature, as other variants of intervals distribution are also possible.

The number of intervals "d" within the selected range of input signals 104 may be increased to optimize the p-net 100. Such optimization of the p-net 100 may be desirable, for example, with the increase in complexity of training the input images 106. For example, a greater number of intervals may be needed for multi-color images as compared with mono-color images, and a greater number of intervals may be needed for complex ornaments than for simple graphics. An increased number of intervals may be needed for precise recognition of images with complex color gradients as compared with images described by contours, as well for a larger overall number of training images. A reduction in the number of intervals "d" may also be needed in cases with a high magnitude of noise, a high variance in training images, and excessive consumption of computing resources.

Depending on the task or type of information handled by the p-net 100, for example, visual or textual data, data from sensors of various nature, different number of intervals and the type of distribution thereof can be assigned. For each input signal value interval "d", a corresponding corrective weight of the given synapse with the index "d" may be assigned. Thus, a certain interval "d" will include all corrective weights 112 with the index "i" relevant to the given input, the index "d" relevant to the given interval; and all values for the index "n" from 0 to n. In the process of training the p-net 100, the distributor 114 defines each input signal value and thus relates the subject input signal 104 to the corresponding interval "d". For example, if there are 10 equal intervals "d" within the range of input signals from 0 to 100, the input signal having a value between 30 and 40 will be related to the interval 3, i.e., "d"=3.

Figures 6A, 6B, 6C:
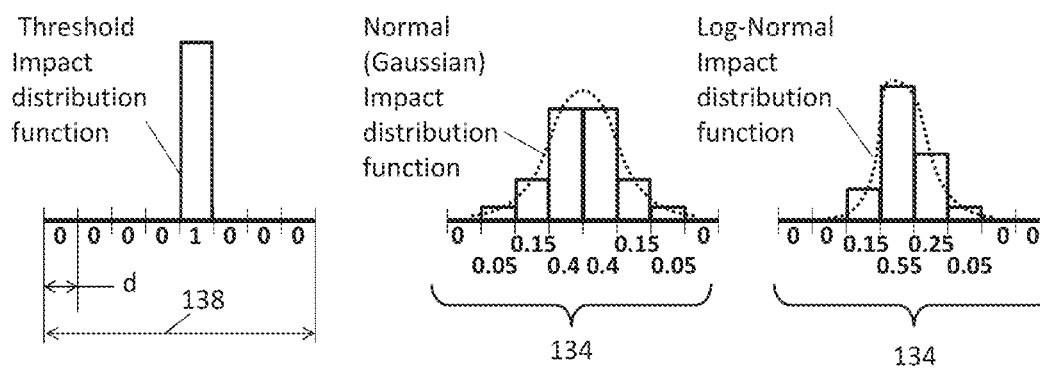
FIG. 6A is a schematic illustration of one embodiment of a distribution for values of coefficient of impact of corrective weights in the p-net shown in FIG. 2.
FIG. 6B is a schematic illustration of another embodiment of the distribution for values of coefficient of impact of corrective weights in the p-net shown in FIG. 2.
FIG. 6C is a schematic illustration of yet another embodiment of the distribution for values of coefficient of impact of corrective weights in the p-net shown in FIG. 2.
Figure 7:
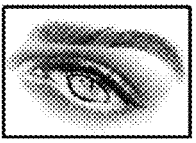
FIG. 7 is a schematic illustration of an input image for the p-net shown in FIG. 2, as well as one corresponding table representing the image in the form of digital codes and another corresponding table representing the same image as a set of respective intervals.

For all corrective weights 112 of each synapse 118 connected with the given input 102, the distributor 114 can assign values of the coefficient of impact 134 in accordance with the interval "d" related to the particular input signal. The distributor 114 can also assign values of the coefficient of impact 134 in accordance with a pre-determined distribution of values of the coefficient of impact 134 (shown in FIG. 6), such as a sinusoidal, normal, logarithmic distribution curve, or a random distribution function. In many cases, the sum or integral of coefficient of impact 134 or $C_{i,d,n}$ for a specific input signal 102 related to each synapse 118 will have a value of 1 (one).

$$\Sigma_{Synapse} C_{i,d,n} = 1$$

or $$\Sigma_{Synapse} C_{i,d,n} = 1 \quad [1]$$

In the simplest case, the corrective weight 112 that corresponds most closely to the input signal value may be assigned a value of 1 (one) to the coefficient of impact 134 ($C_{i,d,n}$), while corrective weights for other intervals may receive a value of 0 (zero).

The p-net 100 is focused on reduction of time duration and usage of other resources during training of the p-net, as compared with classical neuron network 10. Although some of the elements disclosed herein as part of the p-net 100 are designated by certain names or identifiers known to those familiar with classical neural networks, the specific names are used for simplicity and may be employed differently from their counterparts in classical neural networks. For example, synaptic weights 16 controlling magnitudes of the input signals are instituted during the process of general setup of the classical neural network 10 and are changed during training of the classical network. On the other hand, training of the p-net 100 is accomplished by changing the corrective weights 112, while the synaptic weights 108 do not change during training. Additionally, as discussed above, each of the neurons 116 includes a summing or adding component, but does not include an activation function device 22 that is typical to the classical neural network 10.

In general, the p-net 100 is trained by training each neuron unit 119 that includes a respective neuron 116 and all the connecting synapses 118, including the particular neuron and all the respective synapses 118 and correction weights 112 connected with the subject neuron. Accordingly, training of the p-net 100 includes changing corrective weights 112 contributing to the respective neuron 116. Changes to the corrective weights 112 take place based on a group-training algorithm included in a method 200 disclosed in detail below. In the disclosed algorithm, training error, i.e., deviation 128, is determined for each neuron, based on which correction values are determined and assigned to each of the weights 112 used in determining the sum obtained by each respective neuron 116. Introduction of such correction values during training is intended to reduce the deviations 128 for the subject neuron 116 to zero. During training with additional images, new errors related to images utilized earlier may again appear. To eliminate such additional errors, after completion of one training epoch, errors for all training images of the entire p-net 100 may be calculated, and if such errors are greater than pre-determined values, one or more additional training epochs may be conducted until the errors become less than a target or predetermined value.

Figure 22:
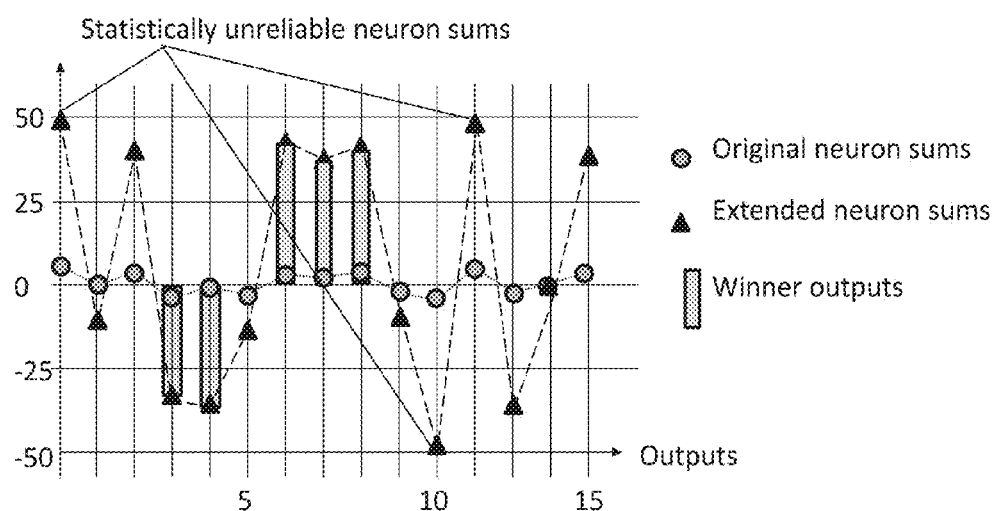
FIG. 22 is a schematic illustration of extending of neuron sums during training of the p-net shown in FIG. 2.
Figure 23:
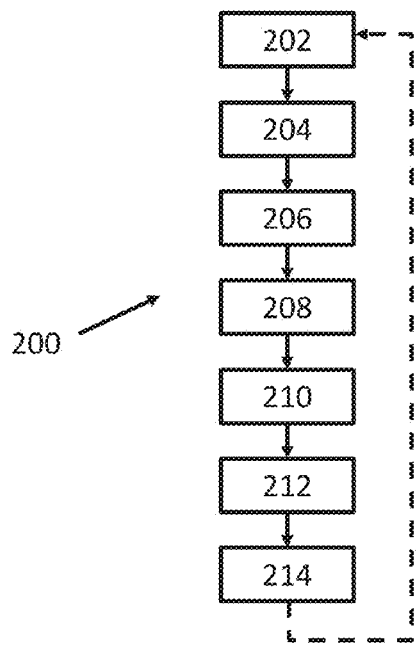
FIG. 23 is a flow diagram of a method used to train the p-net shown in FIGS. 2-22.

FIG. 23 depicts the method 200 of training the p-net 100, as described above with respect to FIGS. 2-22. The method 200 commences in frame 202 where the method includes receiving, via the input 102, the input signal 104 having the input value. Following frame 202, the method advances to frame 204. In frame 204, the method includes communicating the input signal 104 to the distributor 114 operatively connected to the input 102. Either in frame 202 or frame 204, the method 200 may include defining each corrective weight 112 by the set of indexes. As described above with respect to the structure of the p-net 100, the set of indexes may include the input index "i" configured to identify the corrective weight 112 corresponding to the input 102. The set of indexes may also include the interval index "d" configured to specify the selected interval for the respective corrective weight 112, and the neuron index "n" configured to specify the corrective weight 112 corresponding to the specific neuron 116 as "$W_{i,d,n}$". The set of indexes may additionally include the access index "a" configured to tally a number of times the respective corrective weight 112 is accessed by the input signal 104 during training of the p-net 100. Accordingly, the present status of each corrective weight may adopt the nomenclature "$W_{i,d,n,a}$".

After frame 204, the method proceeds to frame 206, in which the method includes selecting, via the distributor 114, in correlation with the input value, one or more corrective weights 112 from the plurality of corrective weights located on the synapse 118 connected to the subject input 102. As described above, each corrective weight 112 is defined by its respective weight value. In frame 206 the method may additionally include assigning, via the distributor 114, the plurality of coefficients of impact 134 to the plurality of corrective weights 112. In frame 206 the method may also include assigning each coefficient of impact 134 to one of the plurality of corrective weights 112 in a predetermined proportion to generate the neuron sum 120. Also, in frame 206 the method may include adding up, via the neuron 116, a product of the corrective weight 112 and the assigned coefficient of impact 134 for all the synapses 118 connected thereto. Additionally, in frame 206 the method may include applying, via the weight correction calculator 122, a portion of the determined difference to each corrective weight 112 used to generate the neuron sum 120 according to the proportion established by the respective coefficient of impact 134.

As described above with respect to the structure of the p-net 100, the plurality of coefficients of impact 134 may be defined by an impact distribution function 136. In such a case, the method may additionally include receiving the input value into the value range 138 divided into intervals "d" according to the interval distribution function 140, such that the input value is received within a respective interval, and each corrective weight 112 corresponds to one of the intervals. Also, the method may include using, via the distributor 114, the received input value to select the respective interval "d" and assign the plurality of coefficients of impact 134 to the corrective weight 112 corresponding to the selected respective interval "d" and to at least one corrective weight corresponding to an interval adjacent to the selected respective interval "d". As described above with respect to the structure of the p-net 100, corrective weights 112 corresponding to an interval adjacent to the selected respective interval "d" may be identified, for example, as $W_{i,d+1,n}$ or $W_{i,d-1,n}$.

Following frame 206, the method advances to frame 208. In frame 208, the method includes adding up the weight values of the selected corrective weights 112 by the specific neuron 116 connected with the input 102 via the synapse 118 to generate the neuron sum 120. As described above with respect to the structure of the p-net 100, each neuron 116 includes at least one output 117. After frame 208, the method proceeds to frame 210, in which the method includes receiving, via the weight correction calculator 122, the desired output signal 124 having the signal value. Following frame 210, the method advances to frame 212 in which the method includes determining, via the weight correction calculator 122, the deviation 128 of the neuron sum 120 from the value of the desired output signal 124.

As disclosed above in the description of the p-net 100, the determination of the deviation 128 of the neuron sum 120 from the desired output signal value may include determining the mathematical difference therebetween. Additionally, the modification of the respective corrective weights 112 may include apportioning the mathematical difference to each corrective weight used to generate the neuron sum 120. Alternatively, the apportionment of the mathematical difference may include dividing the determined difference equally between each corrective weight 112 used to generate the neuron sum 120. In a yet separate embodiment, the determination of the deviation 128 may also include dividing the value of the desired output signal 124 by the neuron sum 120 to thereby generate the deviation coefficient. Furthermore, in such a case, the modification of the respective corrective weights 112 may include multiplying each corrective weight 112 used to generate the neuron sum 120 by the generated deviation coefficient.

After frame 212, the method proceeds to frame 214. In frame 214 the method includes modifying, via the weight correction calculator 122, respective corrective weight values using the determined deviation 128. The modified corrective weight values can subsequently be added or summed up and then used to determine a new neuron sum 120. The summed modified corrective weight values can then serve to minimize the deviation of the neuron sum 120 from the value of the desired output signal 124 and thereby train the p-net 100. Following frame 214, method 200 can include returning to frame 202 to perform additional training epochs until the deviation of the neuron sum 120 from the value of the desired output signal 124 is sufficiently minimized. In other words, additional training epochs can be performed to converge the neuron sum 120 on the desired output signal 124 to within the predetermined deviation or error value, such that the p-net 100 can be considered trained and ready for operation with new images.

Generally, the input images 106 need to be prepared for training of the p-net 100. Preparation of the p-net 100 for training generally begins with formation of a set of training images, including the input images 106 and, in the majority of cases, desired output images 126 corresponding to the subject input images. The input images 106 (shown in FIG. 2) defined by the input signals $I_1, I_2 \ldots I_m$ for training of the p-net 100 are selected in accordance with tasks that the p-net is assigned to handle, for example recognition of human images or other objects, recognition of certain activities, clustering or data classification, analysis of statistical data, pattern recognition, forecasting, or controlling certain processes. Accordingly, the input images 106 can be presented in any format suitable for introduction into a computer, for example, using formats jpeg, gif, or pptx, in the form of tables, charts, diagrams and graphics, various document formats, or a set of symbols.

Preparation for training of the p-net 100 may also include conversion of the selected input images 106 for their unification that is convenient for the processing of the subject images by the p-net 100, for example, transforming all images to a format having the same number of signals, or, in the case of pictures, same number of pixels. Color images could be, for example, presented as a combination of three basic colors. Image conversion could also include modification of characteristics, for example, shifting an image in space, changing visual characteristics of the image, such as resolution, brightness, contrast, colors, viewpoint, perspective, focal length and focal point, as well as adding symbols, numbers, or notes.

After selection of the number of intervals, a specific input image may be converted into an input image in interval format, that is, real signal values may be recorded as numbers of intervals to which the subject respective signals belong. This procedure can be carried out in each training epoch for the given image. However, the image may also be formed once as a set of interval numbers. For example, in FIG. 7 the initial image is presented as a picture, while in the table "Image in digital format" the same image is presented in the form of digital codes, and in the table "Image in interval format" then image is presented as a set of interval numbers, where a separate interval is assigned for each 10 values of digital codes.

The described structure of the p-net 100 and the training algorithm or method 200 as described permit continued or iterative training of the p-net, thus there is no requirement to form a complete set of training input images 106 at the start of the training process. It is possible to form a relatively small starting set of training images, and such a starting set could be expanded as necessary. The input images 106 may be divided into distinct categories, for example, a set of pictures of one person, a set of photos of cats, or a set of photographs of cars, such that each category corresponds to a single output image, such a person's name or a specific label. Desired output images 126 represent a field or table of digital, where each point corresponds to a specific numeric value from $-\infty$ to $+\infty$, or analog values. Each point of the desired output image 126 may correspond to the output of one of the neurons of the p-net 100. Desired output images 126 can be encoded with digital or analog codes of images, tables, text, formulas, sets of symbols, such as barcodes, or sounds.

Figure 8:
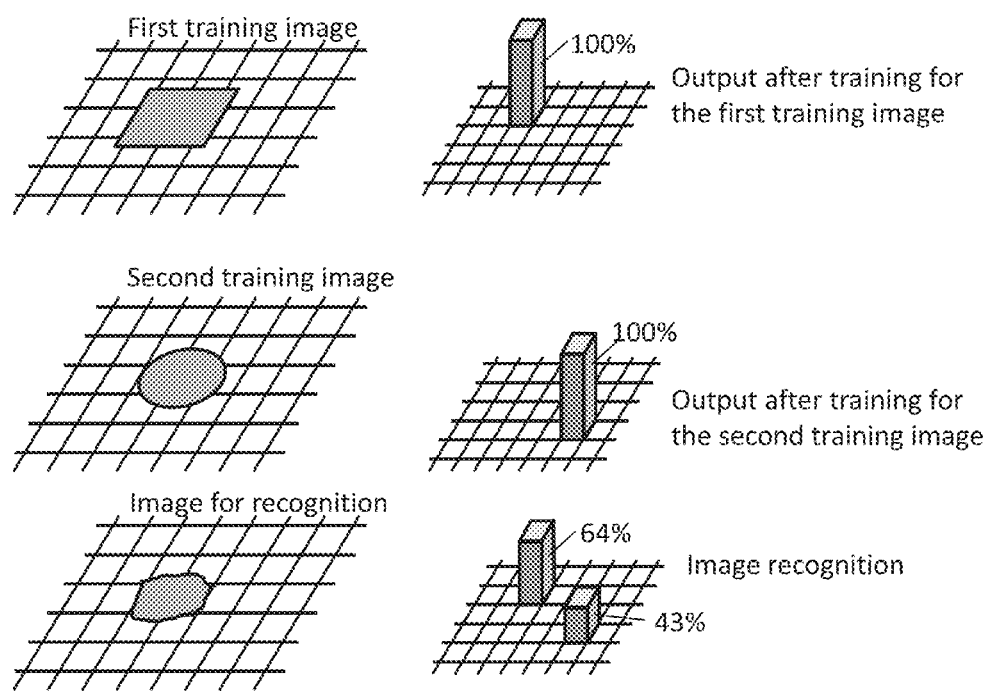
FIG. 8 is a schematic illustration of an embodiment of the p-net shown in FIG. 2 trained for recognition of two distinct images, wherein the p-net is configured to recognize a picture that includes some features of each image.

In the simplest case, each input image 106 may correspond to an output image, encoding the subject input image. One of the points of such output image may be assigned a maximum possible value, for example 100%, whereas all other points may be assigned a minimum possible value, for example, zero. In such a case, following training, probabilistic recognition of various images in the form of a percentage of similarity with training images will be enabled. FIG. 8 shows an example of how the p-net 100 trained for recognition of two images, a square and a circle, may recognize a picture that contains some features of each figure being expressed in percentages, with the sum not necessarily equal 100%. Such a process of pattern recognition by defining the percentage of similarity between different images used for training can be used to classify specific images.

To improve the accuracy and exclude errors, coding can be accomplished using a set of several neural outputs rather than one output (see below). In the simplest case, output images may be prepared in advance of training. However, it is also possible to have the output images formed by the p-net 100 during training.

In the p-net 100, there is also a possibility of inverting the input and output images. In other words, input images 106 can be in the form of a field or table of digital or analog values, where each point corresponds to one input of the p-net, while output images can be presented in any format suitable for introduction into the computer, for example using formats jpeg, gif, pptx, in the form of tables, charts, diagrams and graphics, various document formats, or a set of symbols. The resultant p-net 100 can be quite suitable for archiving systems, as well as an associative search of images, musical expressions, equations, or data sets.

Following preparation of the input images 106, typically the p-net 100 needs to be formed and/or parameters of an existing p-net must be set for handling given task(s). Formation of the p-net 100 may include the following designations:
  dimensions of the p-net 100, as defined by the number of inputs and outputs;
  synaptic weights 108 for all inputs;
  number of corrective weights 112;
  distribution of coefficients of corrective weight impact $(C_{i,d,n})$ for different values of input signals 104; and
  desired accuracy of training The number of inputs is determined based on the sizes of input images 106. For example, a number of pixels can be used for pictures, while the selected number of outputs can depend on the size of desired output images 126. In some cases, the selected number of outputs may depend on the number of categories of training images.

Values of individual synaptic weights 108 can be in the range of $-\infty$ to $+\infty$. Values of synaptic weights 108 that are less than 0 (zero) can denote signal amplification, which can be used to enhance the impact of signals from specific inputs, or from specific images, for example, for a more effective recognition of human faces in photos containing a large number of different individuals or objects. On the other hand, values of synaptic weights 108 that are greater than 0 (zero) can be used to denote signal attenuation, which can be used to reduce the number of required calculations and increase operational speed of the p-net 100. Generally, the greater the value of the synaptic weight, the more attenuated is the signal transmitted to the corresponding neuron. If all synaptic weights 108 corresponding to all inputs are equal and all neurons are equally connected with all inputs, the neural network will become universal and will be most effective for common tasks, such as when very little is known about the nature of the images in advance. However, such a structure will generally increase the number of required calculations during training and operation.

Figure 9:
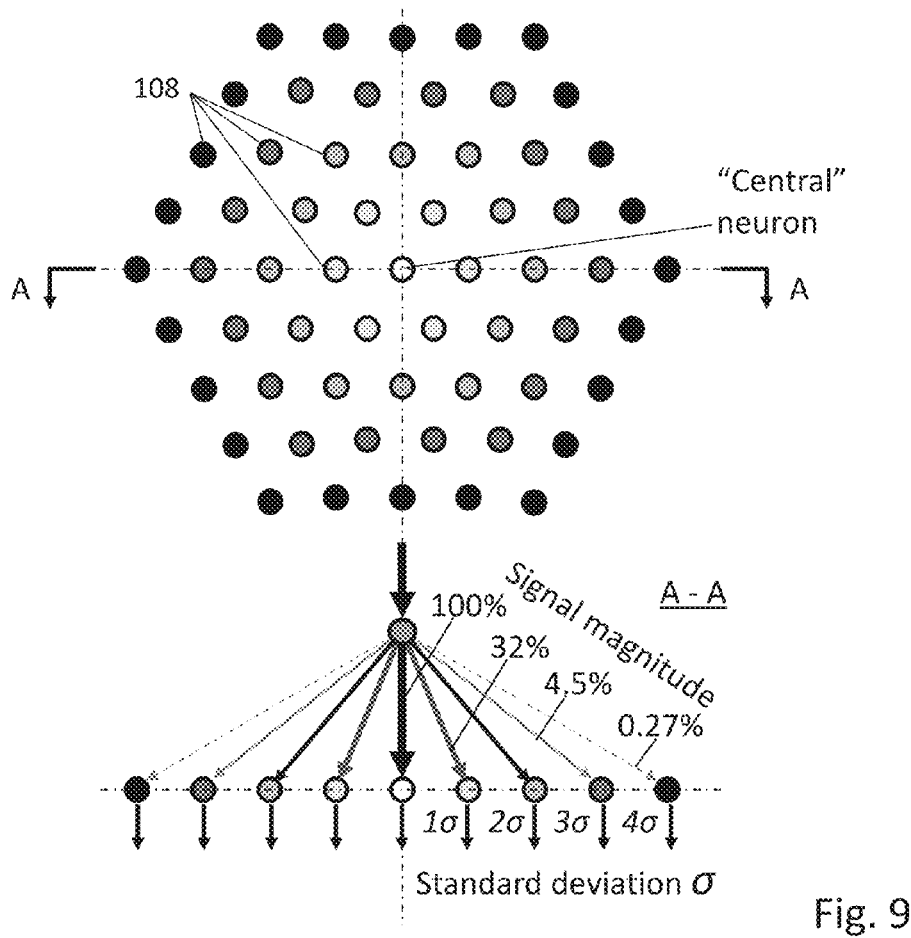
FIG. 9 is a schematic illustration of an embodiment of the p-net shown in FIG. 2 with an example of distribution of synaptic weights around a "central" neuron.
Figure 10:
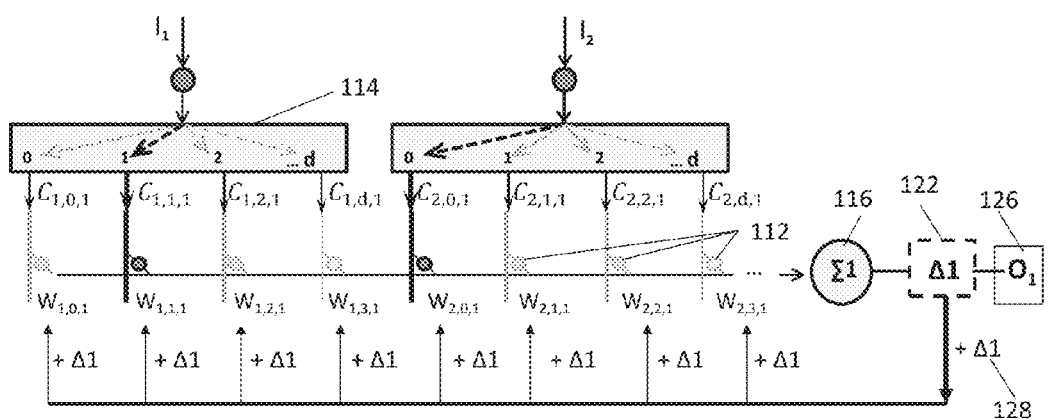
FIG. 10 is a schematic illustration of an embodiment of the p-net shown in FIG. 2, depicting a uniform distribution of training deviation between corrective weights.

FIG. 9 shows an embodiment of the p-net 100 in which the relationship between an input and respective neurons is reduced in accordance with statistical normal distribution. Uneven distribution of synaptic weights 108 can result in the entire input signal being communicated to a target or "central" neuron for the given input, thus assigning a value of zero to the subject synaptic weight. Additionally, uneven distribution of synaptic weights can result in other neurons receiving reduced input signal values, for example, using normal, log-normal, sinusoidal, or other distribution. Values of the synaptic weights 108 for the neurons 116 receiving reduced input signal values can increase along with the increase of their distance from the "central" neuron. In such a case, the number of calculations can be reduced and operation of the p-net can speed up. Such networks, which are a combination of known fully connected and non-fully connected neural networks may be the exceedingly effective for analysis of images with strong internal patterns, for example, human faces or consecutive frames of a movie film.

FIG. 9 shows an embodiment of the p-net 100 that is effective for recognition of local patterns. In order to improve the identification of common patterns, 10-20% of strong connections, where the values of the synaptic weights 108 are small or zero, can be distributed throughout the entire p-net 100, in a deterministic, such as in the form of a grid, or a random approach. The actual formation of the p-net 100 intended for handling a particular task is performed using a program, for example, written in an object-oriented programming language, that generates main elements of the p-net, such as synapses, synaptic weights, distributors, corrective weights, neurons, etc., as software objects. Such a program can assign relationships between the noted objects and algorithms specifying their actions. In particular, synaptic and corrective weights can be formed in the beginning of formation of the p-net 100, along with setting their initial values. The p-net 100 can be fully formed before the start of its training, and be modified or added-on at a later frame, as necessary, for example, when information capacity of the network becomes exhausted, or in case of a fatal error. Completion of the p-net 100 is also possible while training continues.

If the p-net 100 is formed in advance, the number of selected corrective weights on a particular synapse may be equal to the number of intervals within the range of input signals. Additionally, corrective weights may be generated after the formation of the p-net 100, as signals in response to appearance of individual intervals. Similar to the classical neural network 10, selection of parameters and settings of the p-net 100 is provided with a series of targeted experiments. Such experiments can include (1) formation of the p-net with the same synaptic weights 108 at all inputs, and (2) assessment of input signal values for the selected images and initial selection of the number of intervals. For example, for recognition of binary (one-color) images, it may be sufficient to have only 2 intervals; for qualitative recognition of 8 bit images, up to 256 intervals can be used; approximation of complex statistical dependencies may require dozens or even hundreds of intervals; for large databases, the number of intervals could be in the thousands.

In the process of training the p-net 100, the values of input signals may be rounded as they are distributed between the specific intervals. Thus, accuracy of input signals greater than the width of the range divided by the number of intervals may not be required. For example, if the input value range is set for 100 units and the number of intervals is 10, the accuracy better than ±5 will not be required. Such experiments can also include (3) selection of uniform distribution of intervals throughout the entire range of values of the input signals and the simplest distribution for coefficients of corrective weight impact $C_{i,d,n}$ can be set equal to 1 for corrective weight corresponding to the interval for the particular input signal, while the corrective weight impact for all remaining corrective weights can be set to 0 (zero). Such experiments can additionally include (4) training p-net 100 with one, more, or all prepared training images with pre-determined accuracy.

Training time of the p-net 100 for predetermined accuracy can be established by experimentation. If accuracy and training time of the p-net 100 are satisfactory, selected settings could be either maintained or changed, while a search is continued for a more effective variant. If the required accuracy is not achieved, for optimization purposes influence of specific modification may be evaluated, which can be performed either one at the time, or in groups. Such evaluation of modifications may include changing, either increasing or reducing, the number of intervals; changing the type of distribution of the coefficients of corrective weight impact ($C_{i,d,n}$), testing variants with non-uniform distribution of intervals, such as using normal, power, logarithmic, or log-normal distribution; and changing values of synaptic weights 108, for example their transition to non-uniform distribution.

If the required training time for an accurate result is deemed excessive, training with an increased number of intervals, can be evaluated for its effect on training time. If, as a result, the training time was reduced, the increase in the number of intervals can be repeated until desired training time is obtained without a loss of required accuracy. If the training time grows with increasing number of intervals instead of being reduced, additional training can be performed with reduced number of intervals. If the reduced number of intervals results in reduced training time, the number of intervals could be further reduced until desired training time is obtained.

Formation of the p-net 100 settings can be via training with pre-determined training time and experimental determination of training accuracy. Parameters could be improved via experimental changes similar to those described above. Actual practice with various p-nets has shown that the procedure of setting selection is generally straight-forward and not time-consuming.

Actual training of the p-net 100 as part of the method 200, shown in FIG. 23, starts with feeding the input image signals $I_1, I_2 \ldots I_m$ to the network input devices 102, from where they are transmitted to synapses 118, pass through the synaptic weight 108 and enter the distributor (or a group of distributors) 114. Based on the input signal value, the distributor 114 sets the number of the interval "d" that the given input signal 104 corresponds to, and assigns coefficients of corrective weight impact $C_{i,d,n}$ for all the corrective weights 112 of the weight correction blocks 110 of all the synapses 118 connected with the respective input 102. For example, if the interval "d" may be set to 3 for the first input, for all weights $W_{1,3,n}$ $C_{1,3,n}=1$ is set to 1, while for all other weights with i≠1 and d≠3, $C_{i,d,n}$ can be set to 0 (zero).

For each neuron 116, identified as "n" in the relationship below, neuron output sums $\Sigma 1, \Sigma 2 \ldots \Sigma n$ are formed by multiplying each corrective weight 112, identified as $W_{i,d,n}$ in the relationship below, by a corresponding coefficient of corrective weight impact $C_{i,d,n}$ for all synapses 118 contributing into the particular neuron and by adding all the obtained values:

$$\Sigma_n = \Sigma_{i,d,n} W_{i,d,n} \times C_{i,d,n} \qquad [2]$$

Multiplication of $W_{i,d,n} \times C_{i,d,n}$ can be performed by various devices, for example by distributors 114, devices with stored weights or directly by neurons 116. The sums are transferred via neuron output 117 to the weight correction calculator 122. The desired output signals $O_1, O_2 \ldots O_n$ describing the desired output image 126 are also fed to the calculator 122.

Figure 11:
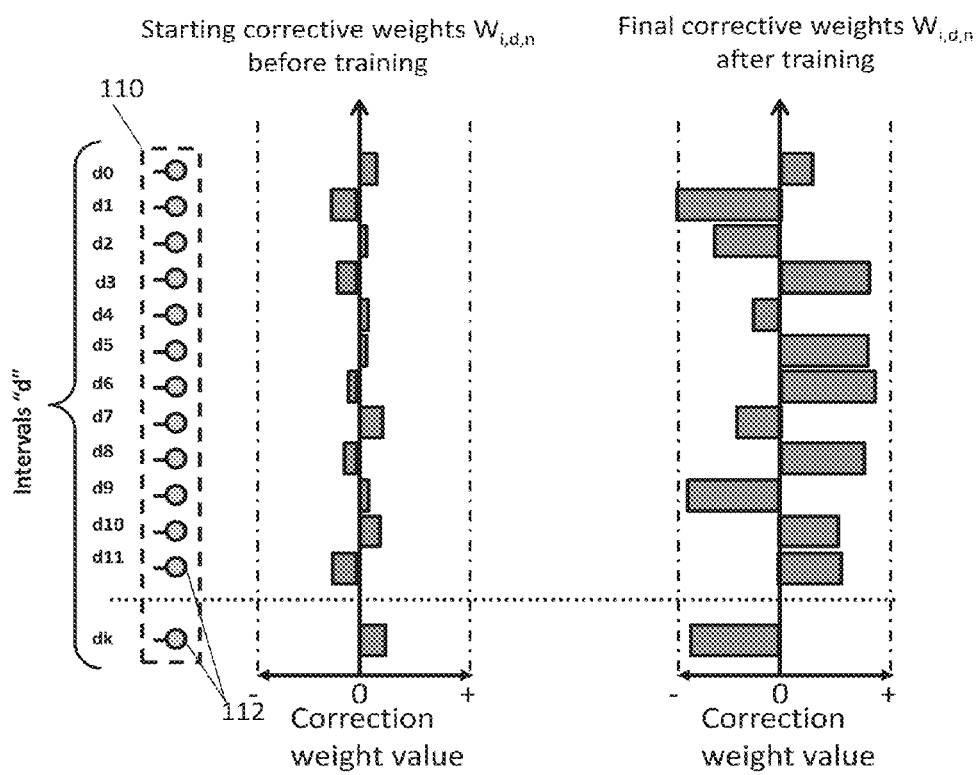
FIG. 11 is a schematic illustration of an embodiment of the p-net shown in FIG. 2, employing modification of the corrective weights during p-net training.
Figure 12:
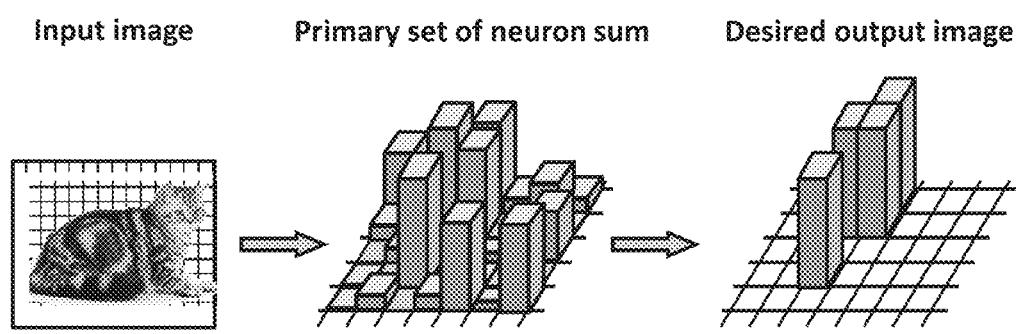
FIG. 12 is a schematic illustration of an embodiment of the p-net shown in FIG. 2, wherein the basic algorithm generates a primary set of output neuron sums, and wherein the generated set is used to generate several "winner" sums with either retained or increased values and the contribution of remaining sums is negated.

As discussed above, the weight correction calculator 122 is a computation device for calculating the modified value for corrective weights by comparison of the neuron output sums $\Sigma 1, \Sigma 2 \ldots \Sigma n$ with desired output signals $O_1, O_2 \ldots O_n$. FIG. 11 shows a set of corrective weights $W_{i,d,1}$, contributing into the neuron output sum $\Sigma 1$, which are multiplied by corresponding coefficient of corrective weight impact $C_{i,d,1}$, and these products are subsequently added by the neuron output sum $\Sigma 1$:

$$\Sigma 1 = W_{1,0,1} \times C_{1,0,1} + W_{1,1,1} \times C_{1,1,1} + W_{1,2,1} \times C_{1,2,1} + \ldots \qquad [3]$$

As the training commences, i.e., during the first epoch, corrective weights $W_{i,d,1}$ do not correspond to the input image 106 used for training, thus, neuron output sums $\Sigma 1$ are not equal to the corresponding desired output image 126. Based on the initial corrective weights $W_{i,d,1}$, the weight correction system calculates the correction value $\Delta 1$, which is used for changing all the corrective weights contributing to the neuron output sum $\Sigma 1$ ($W_{i,d,1}$). The p-net 100 permits various options or variants for its formation and utilization of collective corrective signals for all corrective weights $W_{i,d,n}$ contributing to a specified neuron 116.

Below are two exemplary and non-limiting variants for the formation and utilization of the collective corrective signals. Variant 1—formation and utilization of corrective signals based on the difference between desired output signals and obtained output sums as follows:

calculation of the equal correction value $\Delta n$ for all corrective weights contributing into the neuron "n" according to the equation:

$$\Delta_n = (O_n - \Sigma_n)/S \qquad [4],$$

Where:

$O_n$—desirable output signal corresponding to the neuron output sum $\Sigma n$;

S—number of synapses connected to the neuron "n".

modification of all corrective weights $W_{i,d,n}$ contributing into the neuron "n" according to the equation:

$$W_{i,d,n} \text{modified} = W_{i,d,n} + \Delta_n / C_{i,d,n} \qquad [5],$$

Variant 2—formation and utilization of corrective signals based on ratio of desired output signals versus obtained output sums as follows:

calculation of the equal correction value $\Delta n$ for all corrective weights contributing into the neuron "n" according to the equation:

$$\Delta_n = O_n / \Sigma_n \qquad [6],$$

modification of all corrective weights $W_{i,d,n}$ contributing into the neuron "n" according to the equation:

$$W_{i,d,n} \text{modified} = W_{i,d,n} \times \Delta_n \qquad [7],$$

Modification of corrective weights $W_{i,d,n}$ by any available variant is intended to reduce the training error for each neuron 116 by converging its output sum $\Sigma_n$ on the value of the desired output signal. In such a way, the training error for a given image can be reduced until such becomes equal, or close to zero.

An example of modification of corrective weights $W_{i,d,n}$ during training is shown in FIG. 11. The values of corrective weights $W_{i,d,n}$ are set before the training starts in the form of random weight distribution with the weight values being set to 0±10% from the correction weight range and reach final weight distribution after training. The described calculation of collective signals is conducted for all neurons 116 in the p-net 100. The described training procedure for one training image can be repeated for all other training images. Such procedure can lead to appearance of training errors for some of the previously trained images, as some corrective weights $W_{i,d,n}$ may participate in several images. Accordingly, training with another image may partially disrupt the distribution of corrective weights $W_{i,d,n}$ formed for the previous images. However, due to the fact that each synapse 118 includes a set of corrective weights $W_{i,d,n}$, training with new images while possibly increasing training error, does not delete the images, for which the p-net 100 was previously trained. Moreover, the more synapses 118 contribute to each neuron 116 and the greater the number of corrective weights $W_{i,d,n}$ at each synapse, the less training for a specific image affects the training for other images.

Each training epoch generally ends with the substantial convergence of the total training error and/or local training errors for all training images. Errors can be evaluated using known statistical methods, such as, for example, the Mean Squared Error (MSE), the Mean Absolute Error (MAE), or the Standard Error Mean (SEM). If the total error or some of the local errors are too high, additional training epoch can be conducted until the error is reduced to less than a predetermined error value. Earlier described process of image recognition with defining the percentage of similarity between different images used for training (shown in FIG. 8) is by itself a process of classification of images along previously defined categories.

For clustering, i.e., dividing images into natural classes or groups that were not previously specified, the basic training algorithm of the method 200 can be modified with the modified Self-Organizing Maps (SOM) approach. The desired output image 126 corresponding to a given input image can be formed directly in the process of training the p-net 100 based on a set of winning neurons with a maximum value of the output neuron sums 120. FIG. 22 shows how the use of the basic algorithm of the method 200 can generate a primary set of the output neuron sums, where the set further is converted such that several greater sums retain their value, or increase, while all other sums are considered equal to zero. This transformed set of output neuron sums can be accepted as the desired output image 126.

Figure 13:
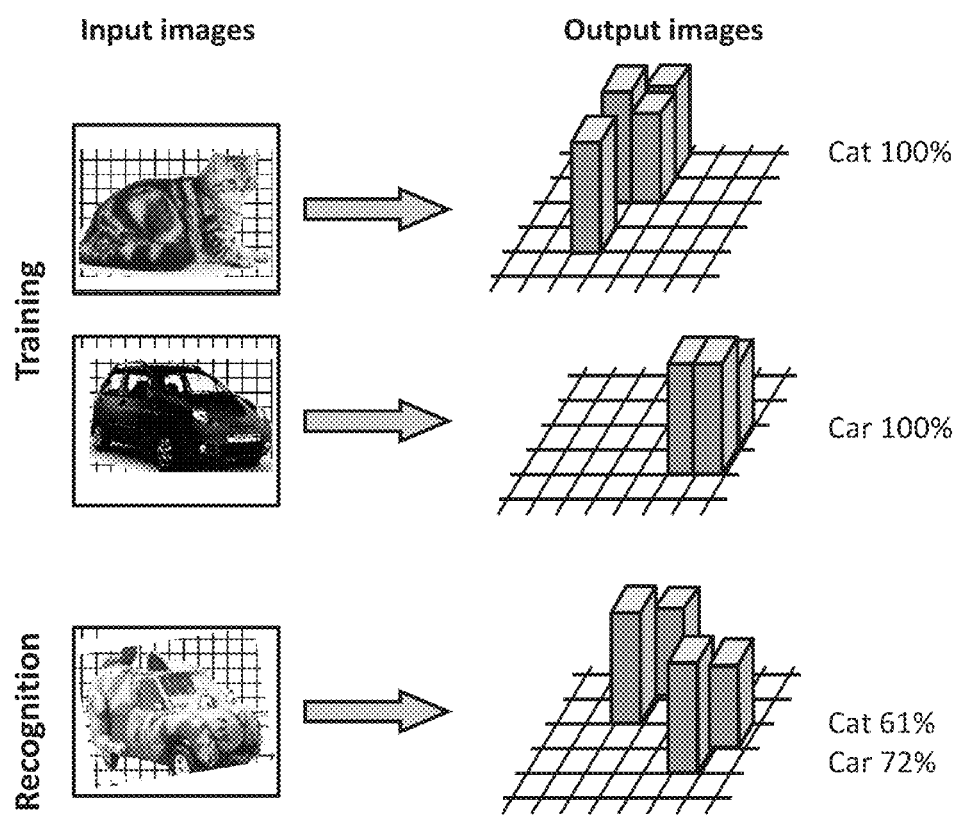
FIG. 13 is a schematic illustration of an embodiment of the p-net shown in FIG. 2 recognizing a complex image with elements of multiple images.
Figure 14:
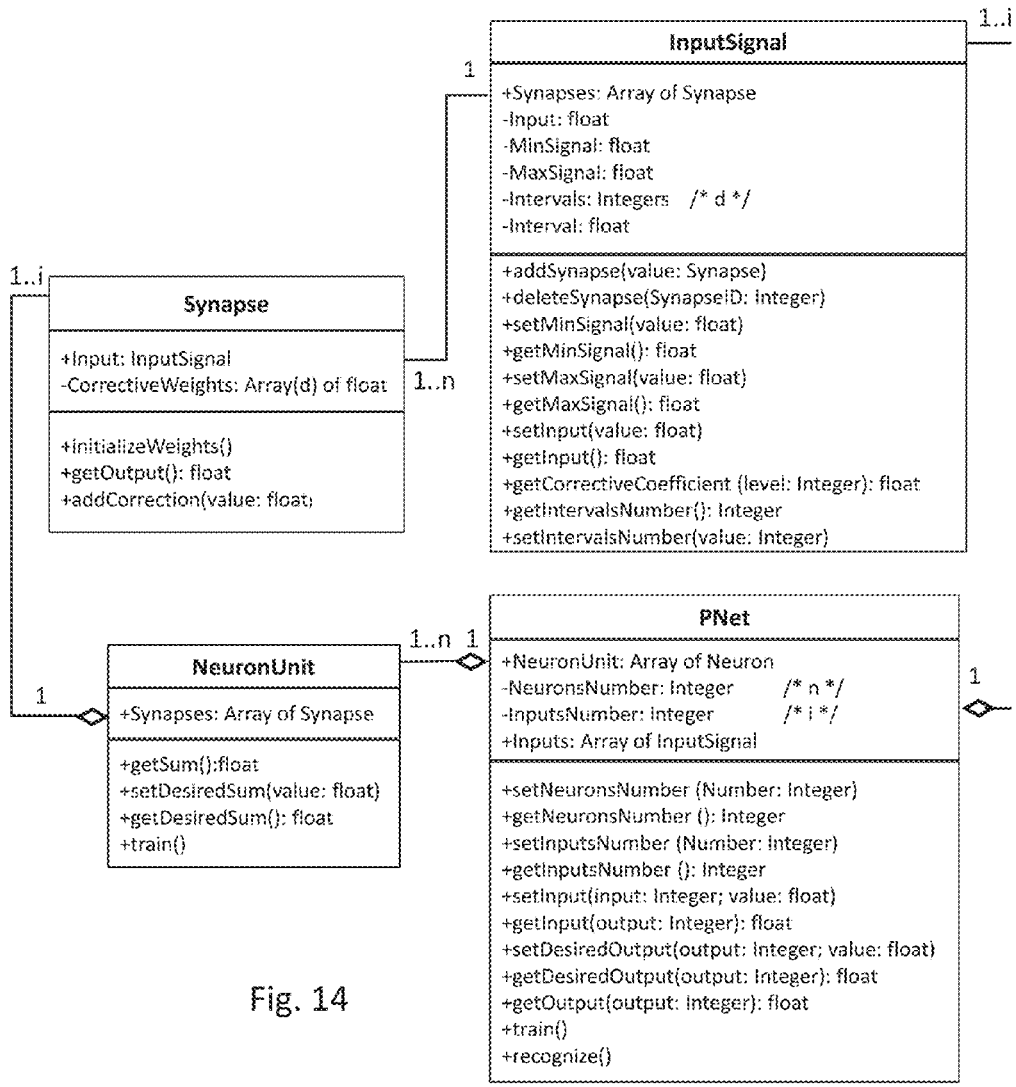
FIG. 14 is a schematic illustration of a model for object oriented programming for the p-net shown in FIG. 2 using Unified Modeling Language (UML).
Figure 15:
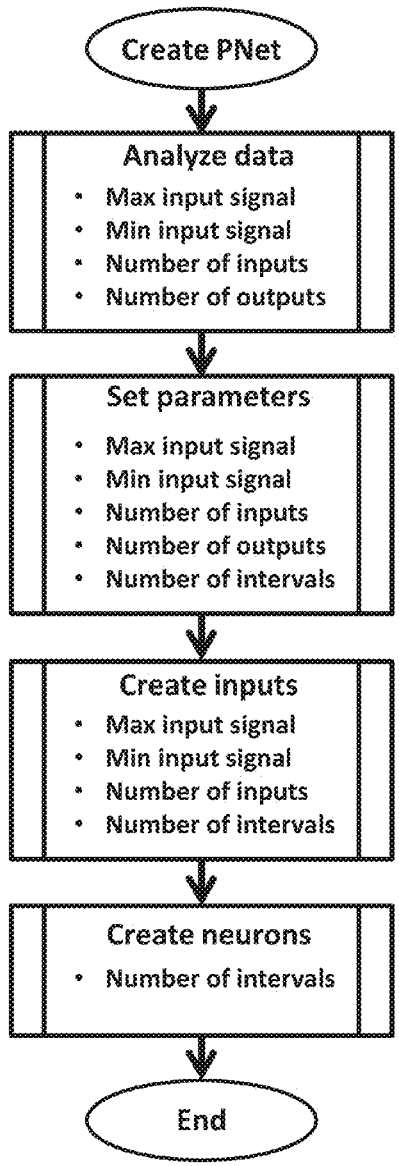
FIG. 15 is a schematic illustration of a general formation sequence of the p-net shown in FIG. 2.
Figure 16:
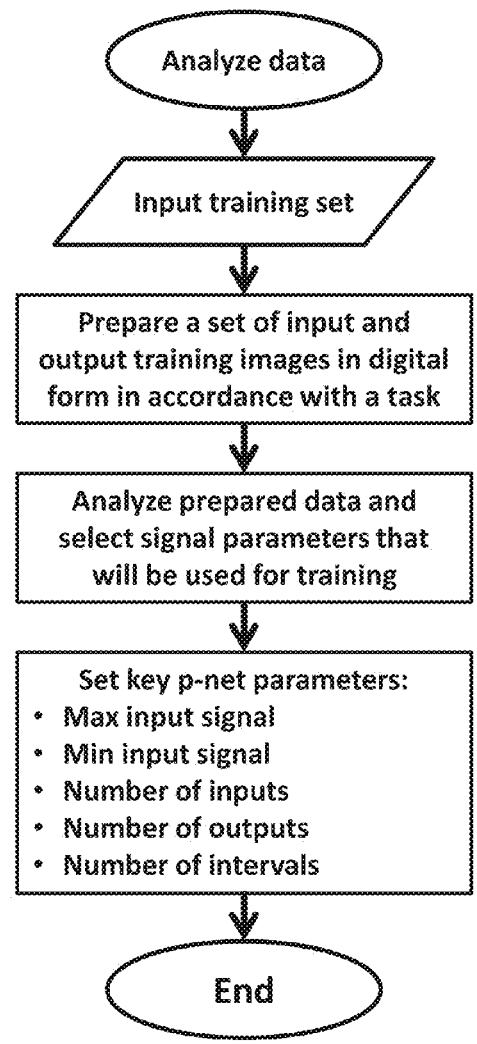
FIG. 16 is a schematic illustration of representative analysis and preparation of data for formation of the p-net shown in FIG. 2.
Figure 17:
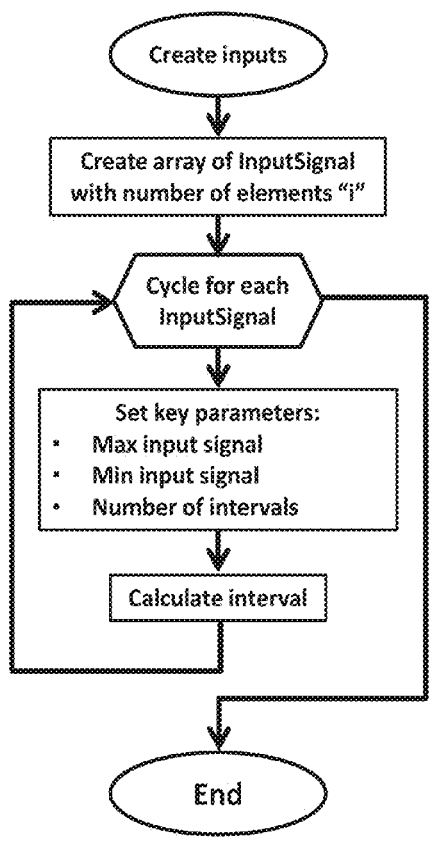
FIG. 17 is a schematic illustration of representative input creation permitting interaction of the p-net shown in FIG. 2 with input data during training and p-net application.
Figure 18:
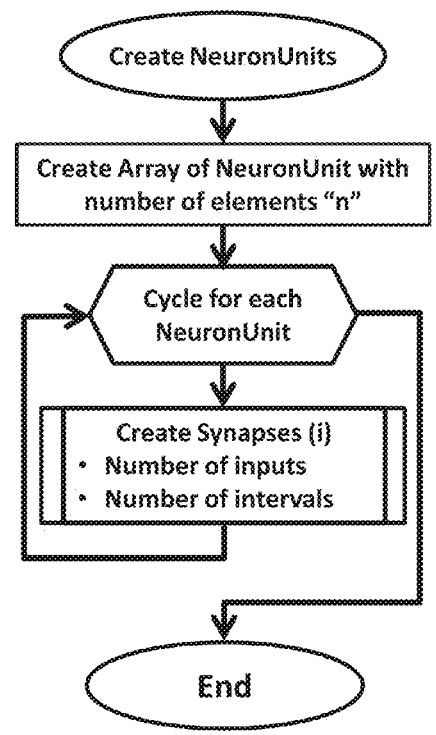
FIG. 18 is a schematic illustration of representative creation of neuron units for the p-net shown in FIG. 2.
Figures 19, 20:
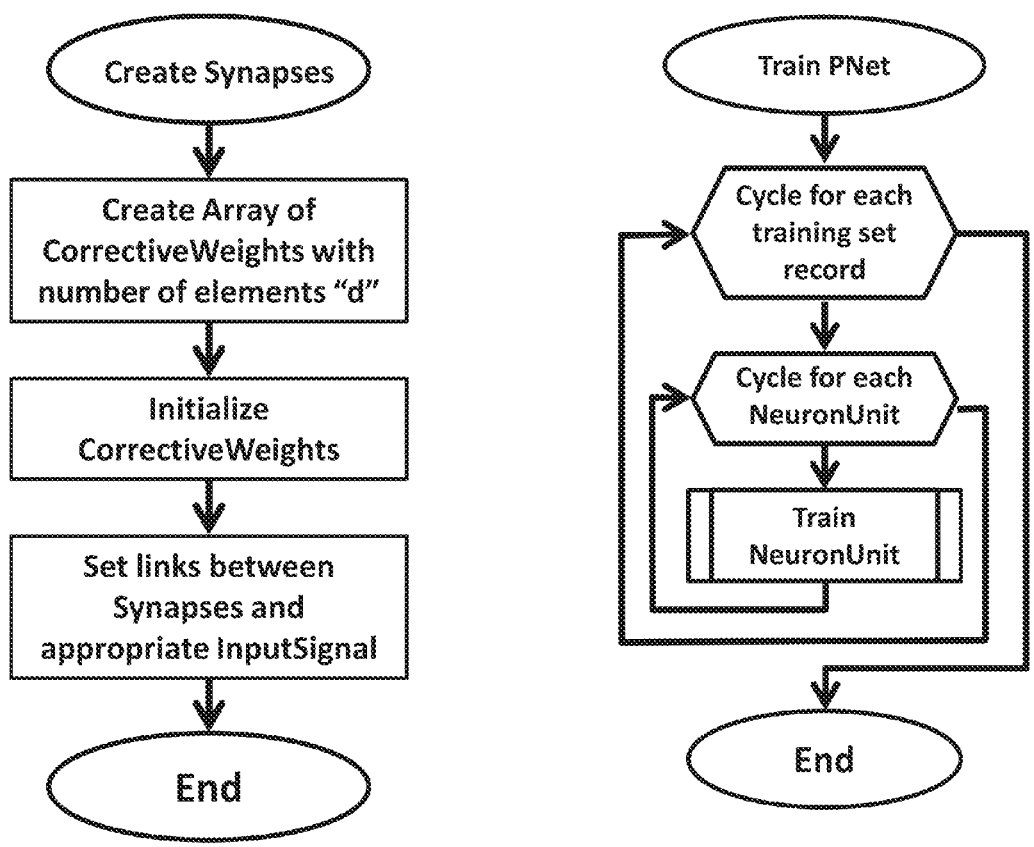
FIG. 19 is a schematic illustration of representative creation of each synapse connected with the neuron units.
FIG. 20 is a schematic illustration of training the p-net shown in FIG. 2.

Formed as described above, the set of desired output images 126 includes clusters or groups. As such, the set of desired output images 126 allows for clustering of linearly inseparable images, which is distinct from the classical network 10. FIG. 13 shows how the described approach can assist with clustering a complex hypothetical image "cat-car", where different features of the image are assigned to different clusters—cats and cars. A set of desired output images 126 created as described can be used, for example, for creating different classifications, statistical analysis, images selection based on criteria formed as a result of clustering. Also, the desired output images 126 generated by the p-net 100 can be used as input images for another or additional p-net, which can also be formed along the lines described for the subject p-net 100. Thus formed, the desired output images 126 may be used for a subsequent layer of a multi-layer p-net.

Classical neural network 10 training is generally provided via a supervised training method that is based on preliminary prepared pairs of an input image and a desired output image. The same general method is also used for training of the p-net 100, however, the increased training speed of the p-net 100 also allows for training with an external trainer. The role of the external trainer can be performed, for example, by an individual or by a computer program. Acting as an external trainer, the individual may be involved in performing a physical task or operate in a gaming environment. The p-net 100 receives input signals in the form of data regarding a particular situation and changes thereto. The signals reflecting actions of the trainer can be introduced as desired output images 126 and permit the p-net 100 to be trained according to the basic algorithm. In such a way, modeling of various processes can be generated by the p-net 100 in real-time.

For example, the p-net 100 can be trained to drive a vehicle by receiving information regarding road conditions and actions of the driver. Through modeling a large variety of critical situations, the same p-net 100 can be trained by many different drivers and accumulate more driving skills than is generally possible by any single driver. The p-net 100 is capable of evaluating a specific road condition in 0.1 seconds or faster and amassing substantial "driving experience" that can enhance traffic safety in a variety of situations. The p-net 100 can also be trained to cooperate with a computer, for example, with a chess-playing machine. The ability of the p-net 100 to easily shift from training mode to the recognition mode and vice versa allows for realization of a "learn from mistakes" mode, when the p-net 100 is trained by an external trainer. In such a case, the partially trained p-net 100 can generate its own actions, for example, to control a technological process. The trainer could control the actions of the p-net 100 and correct those actions when necessary. Thus, additional training of the p-net 100 could be provided.

Informational capacity of the p-net 100 is very large, but is not unlimited. With the set dimensions, such as the number of inputs, outputs, and intervals, of the p-net 100, and with an increase in the number of images that the p-net is trained with, after a certain number of images, the number and magnitude of training errors can also increase. When such an increase in error generation is detected, the number and/or magnitude of errors can be reduced by increasing the size of p-net 100, since the p-net permits increasing the number of neurons 116 and/or the number of the signal intervals "d" across the p-net or in its components between training epochs. P-net 100 expansion can be provided by adding new neurons 116, adding new inputs 102 and synapses 118, changing distribution of the coefficients of corrective weight impact $C_{i,d,n}$, and dividing existing intervals "d".

In most cases p-net 100 will be trained to ensure its ability to recognize images, patterns, and correlations inherent to the image, or to a sets of images. The recognition process in the simplest case repeats the first steps of the training process according to the basic algorithm disclosed as part of the method 200. In particular:

direct recognition starts with formatting of the image according to the same rules that are used to format images for training;

the image is sent to the inputs of the trained p-net 100, distributors assign the corrective weights $W_{i,d,n}$ corresponding to the values of input signals that were set during training, and the neurons generate the respective neuron sums, as shown in FIG. 8;

if the resulting output sums representing the output image 126 fully complies with one of the images that the p-net 100 is being trained with, there is an exact recognition of the object; and if the output image 126 partially complies with several images the p-net 100 is being trained with, the result shows the matching rate with different images as a percentage. FIG. 13 demonstrates that during recognition of the complex image that is made based on a combination of images of a cat and a vehicle, the output image 126 represents the given image combination and indicates the percentage of each initial image's contribution into the combination.

For example, if several pictures of a specific person were used for training, the recognized image may correspond 90% to the first picture, 60% to the second picture, and 35% to the third picture. It may be that the recognized image corresponds with a certain probability to the pictures of other people or even of animals, which means that there is some resemblance between the pictures. However, the probability of such resemblance is likely to be lower. Based on such probabilities, the reliability of recognition can be determined, for example, based on Bayes' theorem.

With the p-net 100 it is also possible to implement multi-stage recognition that combines the advantages of algorithmic and neural network recognition methods. Such multi-stage recognition can include:

initial recognition of an image by a pre-trained network via using not all, but only 1%-10% of inputs, which are herein designated as "basic inputs". Such a portion of the inputs can be distributed within the p-net 100 either uniformly, randomly, or by any other distribution function. For example, the recognition of a person in the photograph that includes a plurality of other objects;

selecting the most informative objects or parts of objects for further detailed recognition. Such selection can be provided according to structures of specific objects that are pre-set in memory, as in the algorithmic method, or according to a gradient of colors, brightness, and/or depth of the image. For example, in recognition of portraits the following recognition zones can be selected: eyes, corners of the mouth, nose shape, as well as certain specific features, such as tattoos, vehicle plate numbers, or house numbers can also be selected and recognized using a similar approach; and detailed recognition of selected images, if necessary, is also possible.

Formation of a computer emulation of the p-net 100 and its training can be provided based of the above description by using any programming language. For example, an object-oriented programming can be used, wherein the synaptic weights 108, corrective weights 112, distributors 114, and neurons 116 represent programming objects or classes of objects, relations are established between object classes via links or messages, and algorithms of interaction are set between objects and between object classes.

Formation and training of the p-net 100 software emulation can include the following:

1. Preparation for the formation and training of the p-net 100, in particular:

conversion of sets of training input images into digital form in accordance with a given task;

analysis of the resulting digital images, including selection of parameters of the input signals to be used for training, for example, frequencies, magnitudes, phases, or coordinates; and setting a range for the training signals, a number of intervals within the subject range, and a distribution of coefficients of corrective weight impact $C_{i,d,n}$.

2. Formation of the p-net software emulation, including:

formation of a set of inputs to the p-net 100. For example, the number of inputs may be equal to the number of signals in the training input image;

formation of a set of neurons, where each neuron represents an adding device;

formation of a set of synapses with synaptic weights, where each synapse is connected to one p-net input and one neuron;

formation of weight correction blocks in each synapse, where the weight correction blocks include distributors and corrective weights, and where each corrective weight has the following characteristics:

Corrective weight input index (i);

Corrective weight neuron index (n);

Corrective weight interval index (d); and

Corrective weight initial value ($W_{i,d,n}$).

designating a correlation between intervals and corrective weights.

3. Training each neuron with one input image, including:

designating coefficients of corrective weight impact $C_{i,d,n}$, including:

determining an interval corresponding to the input signal of the training input image received by each input; and designating magnitudes of the coefficients of corrective weight impact $C_{i,d,n}$ to all corrective weights for all synapses.

calculating neuron output sum ($\Sigma n$) for each neuron "n" by adding corrective weight value $W_{i,d,n}$ of all synaptic weights contributing to the neuron multiplied by the corresponding coefficients of corrective weight impact $C_{i,d,n}$:

$$\Sigma_n = \Sigma_{i,d,n} W_{i,d,n} \times C_{i,d,n}$$

calculating the deviation or training error ($T_n$) via subtraction of the neuron output sum $\Sigma n$ from the corresponding desired output signal $O_n$:

$$T_n = O_n - \Sigma_n;$$

calculating the equal correction value ($\Delta_n$) for all corrective weights contributing to the neuron "n" via dividing the training error by the number of synapses "S" connected to the neuron "n":

$$\Delta_n = T_n / S$$

modifying all corrective weights $W_{i,d,n}$ contributing to the respective neuron by adding to each corrective weight the correction value $\Delta_n$ divided by the corresponding coefficients of corrective weight impact $C_{i,d,n}$:

$$W_{i,d,n} \text{modified} = W_0 + \Delta_n / C_{i,d,n}.$$

Another method of calculating the equal correction value ($\Delta_n$) and modifying the corrective weights $W_{i,d,n}$ for all corrective weight contributing to the neuron "n" can include the following:

dividing the signal of desired output image $O_n$ by a neuron output sum $\Sigma_n$:

$$\Delta_n = O_n / \Sigma_n$$

modifying the corrective weights $W_{i,n,d}$ contributing to the neuron by multiplying the corrective weights by the correction value $\Delta_n$:

$$W_{i,d,n} \text{modified} = W_{i,d,n} \times \Delta_n \quad \quad 5$$

4. Training the p-net 100 using all training images, including:
   repeating the process described above for all selected training images that are included in one training epoch; and
   determining an error or errors of the specific training epoch, comparing those error(s) with a predetermined acceptable error level, and repeating training epochs until the training errors become less than the predetermined acceptable error level.

An actual example of software emulation of the p-net 100 using object-oriented programming is described below and shown in FIGS. 14-21.

Formation of a NeuronUnit object class can include formation of:
   set of objects of the Synapse class;
   neuron 116 presenting a variable, wherein adding is performed during training; and
   calculator 122 presenting a variable, wherein the value of desired neuron sum 120 is stored and calculation of correction values $\Delta_n$ is performed during the training process.

Class NeuronUnit provides p-net 100 training can include:
   formation of neuron sums 120;
   setting desired sums;
   calculation of correction value $\Delta_n$; and
   adding the calculated correction value $\Delta_n$ to the corrective weights $W_{i,n,d}$.

Formation of the object class Synapse can include:
   set of corrective weights $W_{i,n,d}$; and
   pointer indicating the input connected to synapse 118.

Class Synapse can perform the following functions:
   initialization of corrective weights $W_{i,n,d}$;
   multiplying the weights $W_{i,n,d}$ by the coefficients $C_{i,d,n}$; and
   correction of weights $W_{i,n,d}$.

Formation of the object class InputSignal can include:
   set of indexes on synapses 118 connected to a given input 102;
   variable that includes the value of the input signal 104;
   values of possible minimum and maximum input signal;
   number of intervals "d"; and
   interval length.

Class InputSignal can provide the following functions:
   formation of the p-net 100 structure, including:
      Adding and removal of links between an input 102 and synapses 118; and
      Setting the number of intervals "d" for synapses 118 of a particular input 102.
   setting parameters of minimum and maximum input signals 104;
   contribution into the operation of p-net 100:
      setting an input signal 104; and
      setting coefficients of corrective weight impact $C_{i,d,n}$.

Formation of the object class PNet includes a set of object classes:
   NeuronUnit; and
   InputSignal.

Class PNet provides the following functions:
   setting the number of objects of the InputSignal class;
   setting the number of objects of the NeuronUnit class; and
   group request of functions of the objects NeuronUnit and InputSignal.

During the training process the cycles can be formed, where:
   neuron output sum that is equal to zero is formed before the cycle starts;
   all synapses contributing to the given NeuronUnit are reviewed. For each synapse 118:
      Based on the input signal 102, the distributor forms a set of coefficients of corrective weight impact $C_{i,d,n}$;
      All weights $W_{i,n,d}$ of the said synapse 118 are reviewed, and for each weight:
         The value of weight $W_{i,n,d}$ is multiplied by the corresponding coefficient of corrective weight impact $C_{i,d,n}$;
         The result of multiplication is added to the forming neuron output sum;
   correction value $\Delta_n$ is calculated;
   correction value $\Delta_n$ is divided by the coefficient of corrective weight impact $C_{i,d,n}$, i.e., $\Delta_n/C_{i,d,n}$; and
   all synapses 118 contributing to the given NeuronUnit are reviewed. For each synapse 118, all weights $W_{i,n,d}$ of the subject synapse are reviewed, and for each weight its value is modified to the corresponding correction value $\Delta_n$.

The previously noted possibility of additional training of the p-net 100 allows a combination of training with the recognition of the image that enables the training process to be sped up and its accuracy to be improved. When training the p-net 100 on a set of sequentially changing images, such as training on consecutive frames of the film that are slightly different from each other, additional training can include:
   training with the first image;
   recognition of the next image and identifying a percentage of similarity between the new image and the image the network was initially trained with. Additional training is not required if the recognition error is less than its predetermined value; and
   if the recognition error exceeds the predetermined value, additional training is provided.

Training of the p-net 100 by the above basic training algorithm is effective for solving problems of image recognition, but does not exclude the loss or corruption of data due to overlapping images. Therefore, the use of the p-net 100 for memory purposes, though possible, may not be entirely reliable. The present embodiment describes training of the p-net 100 that provides protection against loss or corruption of information. An additional restriction can be introduced into the basic network training algorithm which requires that every corrective weight $W_{i,n,d}$ can be trained only once. After the first training cycle, the value of the weight $W_{i,n,d}$ remains fixed or constant. This can be achieved by entering an additional access index "a" for each corrective weight, which is the above-described index representing the number of accesses to the subject corrective weight during the training process.

As described above, each corrective weight can take on the nomenclature of $W_{i,n,d,a}$, wherein "a" is the number of accesses to the subject weight during the training process. In the simplest case, for the non-modified, i.e., not fixed, weights, a=0, while for the weights that have been modified or fixed by the described basic algorithm, a=1. Moreover, while applying the basic algorithm, the corrective weights $W_{i,n,d,a}$ with the fixed value a=1 can be excluded from the weights to which corrections are being made. In such a case, equations [5], [6], and [7] can be transformed as follows:

| Value | Basic algorithm | Training algorithm with fixed weights |
|---|---|---|
| Equal correction value - Variant 1 | $\Delta_n = (O_n - \Sigma_n)/S$ [4], | $\Delta_n = (O_n - \Sigma_n)/S_0$ [8], where $S_0$ - sum $C_{i,d,n,a}$ of all corrective weights $W_{i,n,d,a}$ contributing to the subject neuron and having the index a = 0 |
| Modified corrective weight - Variant 1 | $W_{i,n,d}$ modified = $W_{i,n,d} + \Delta_n/C_{i,d,n}$ [5], | $W_{i,n,d,0}$ modified = $W_{i,n,d,0} + \Delta_n/C_{i,n,d,0}$ [9], wherein $W_{i,n,d,0}$ are weights contributing to the subject neuron and having the index a = 0, and $C_{i,d,n,0}$ are coefficients of corrective weight impact for the corrective weights contributing to subject the neuron and having the index a = 0 |
| Modified corrective weight - Variant 2 | $W_{i,n,d}$ modified = $W_{i,n,d} \times \Delta_n$ [7], | $W_{i,n,d,0}$ modified = $W_{i,n,d,0} \times \Delta_n$ [10] |

The above restriction can be partially applied to the correction of the previously trained corrective weights $W_{i,n,d,a}$, but only to the weights that form the most important images. For example, within the training on a set of portraits of a single person, one specific image can be declared primary and be assigned priority. After training on such a priority image, all corrective weights $W_{i,n,d,a}$ that are changed in the process of training can be fixed, i.e., where the index a=1, thus designating the weight as $W_{i,n,d,1}$, and other images of the same person may remain changeable. Such priority may include other images, for example those that are used as encryption keys and/or contain critical numeric data.

The changes to the corrective weights $W_{i,n,d,a}$ may also not be completely prohibited, but limited to the growth of the index "a". That is, each subsequent use of the weight $W_{i,n,d,a}$ can be used to reduce its ability to change. The more often a particular corrective weight $W_{i,n,d,a}$ is used, the less the weight changes with each access, and thus, during training on subsequent images, the previous, stored images are changed less and experience reduced corruption. For example, if a=0, any change in the weight $W_{i,n,d,a}$ is possible; when a=1 the possibility of change for the weight can be decreased to ±50% of the weight's value; with a=2 the possibility of change can be reduced to ±25% of the weight's value.

After reaching the predetermined number of accesses, as signified by the index "a", for example, when a=5, further change of the weight $W_{i,n,d,a}$ may be prohibited. Such an approach can provide a combination of high intelligence and information safety within a single p-net 100. Using the network error calculating mechanism, levels of permissible errors can be set such that information with losses within a predetermined accuracy range may be saved, wherein the accuracy range can be assigned according to a particular task. In other words, for the p-net 100 operating with visual images, the error can be set at the level of that cannot be captured by the naked eye, which would provide a significant, "factor of" increase in storage capacity. The above can enable creation of highly effective storage of visual information, for example movies.

The ability to selectively clean computer memory can be valuable for continued high-level functioning of the p-net 100. Such selective cleaning of memory may be done by removing certain images without loss of or corruption of the rest of the stored information. Such cleaning can be provided as follows:

- identification of all corrective weights $W_{i,n,d,a}$ that participate in the image formation, for example, by introducing the image to the network or by compiling the list of used corrective weights for each image;
- reduction of index "a" for the respective corrective weights $W_{i,n,d,a}$; and
- replacement of corrective weights $W_{i,n,d,a}$ either with zero or with a random value close to the middle of the range of possible values for the subject weight when the index "a" is reduced to zero.

An appropriate order and succession of reduction of the index "a" can be experimentally selected to identify strong patterns hidden in the sequence of images. For example, for every 100 images introduced into the p-net 100 during training, there can be a reduction of the index "a" by a count of one, until "a" reaches the zero value. In such a case, the value of "a" can grow correspondingly with the introduction of new images. The competition between growth and reduction of "a" can lead to a situation where random changes are gradually removed from memory, while the corrective weights $W_{i,n,d,a}$ that have been used and confirmed many times can be saved. When the p-net 100 is trained on a large number of images with similar attributes, for example, of the same subject or similar environment, the often-used corrective weights $W_{i,n,d,a}$ constantly confirm their value and information in these areas becomes very stable. Furthermore, random noise will gradually disappear. In other words, the p-net 100 with a gradual decrease in the index "a" can serve as an effective noise filter.

The described embodiments of the p-net 100 training without loss of information allow creating a p-net memory with high capacity and reliability. Such memory can be used as a high-speed computer memory of large capacity providing greater speed than even the "cash memory" system, but will not increase computer cost and complexity as is typical with the "cash memory" system. According to published data, in general, while recording a movie with neural networks, memory can be compressed tens or hundreds of times without significant loss of recording quality. In other words, a neural network is able to operate as a very effective archiving program. Combining this ability of neural networks with the high-speed training ability of the p-net 100 may permit a creation of high-speed data transmission system, a memory with high storage capacity, and high-speed decryption program multimedia files, i.e., a codex.

Due to the fact that in the p-net 100 data is stored as a set of corrective weights $W_{i,n,d,a}$, which is a type of code recording, decoding or unauthorized access to the p-net via existing methods and without the use of an identical network and key is unlikely. Thus, p-net 100 can offer a considerable degree of data protection. Also, unlike conventional computer memory, damage to individual storage elements of the p-net 100 presents an insignificant detrimental effect, since other elements significantly compensate lost functions. In the image recognition process, inherent patterns of the image being used are practically not distorted as a result of damage to one or more elements. The above can dramatically improve the reliability of computers and allow using certain memory blocks, which under normal conditions would be considered defective. In addition, this type of memory is less vulnerable to hacker attacks due to the absence of permanent address(es) for critical bytes in the p-net 100, making it impervious to attack of such a system by a variety of computer viruses.

The previously-noted process of image recognition with determination of the percentage of similarity between different images used in training can also be employed as a process of image classification according to the previously defined categories, as noted above. For clustering, which is a division of the images into not predefined natural classes or groups, the basic training process can be modified. The present embodiment can include:

preparation of a set of input images for training, without including prepared output images;

formation and training the network with the formation of the neuron output sums as it is done according to the basic algorithm;

selection in the resulting output image of the output with maximum output sum, i.e., the winner output, or a group of winner outputs, which can be organized similar to Kohonen network;

creation of a desired output image, in which the winner output or the group of winner outputs receive maximum values. At the same time:

The number of selected winner outputs can be predetermined, for example, in a range of 1 to 10, or winner outputs can be selected according to the rule "no less than N % of the maximum neuron sum", where "N" may be, for example, within 90-100%; and All other outputs can be set equal to zero.

training according to the basic algorithm with using the created desired output image, FIG. 13; and repeating all procedures for other images with formation for each image of different winners or winner groups.

The set of desired output images formed in the above manner can be used to describe clusters or groups into which the plurality of input images can naturally separate. Such a set of desired output images can be used to produce different classifications, such as for selection of images according to the established criteria and in statistical analysis. The above can also be used for the aforementioned inversion of input and output images. In other words, the desired output images can be used as the input images for another, i.e., additional, network, and the output of the additional network can be images presented in any form suitable for computer input.

Figure 21:
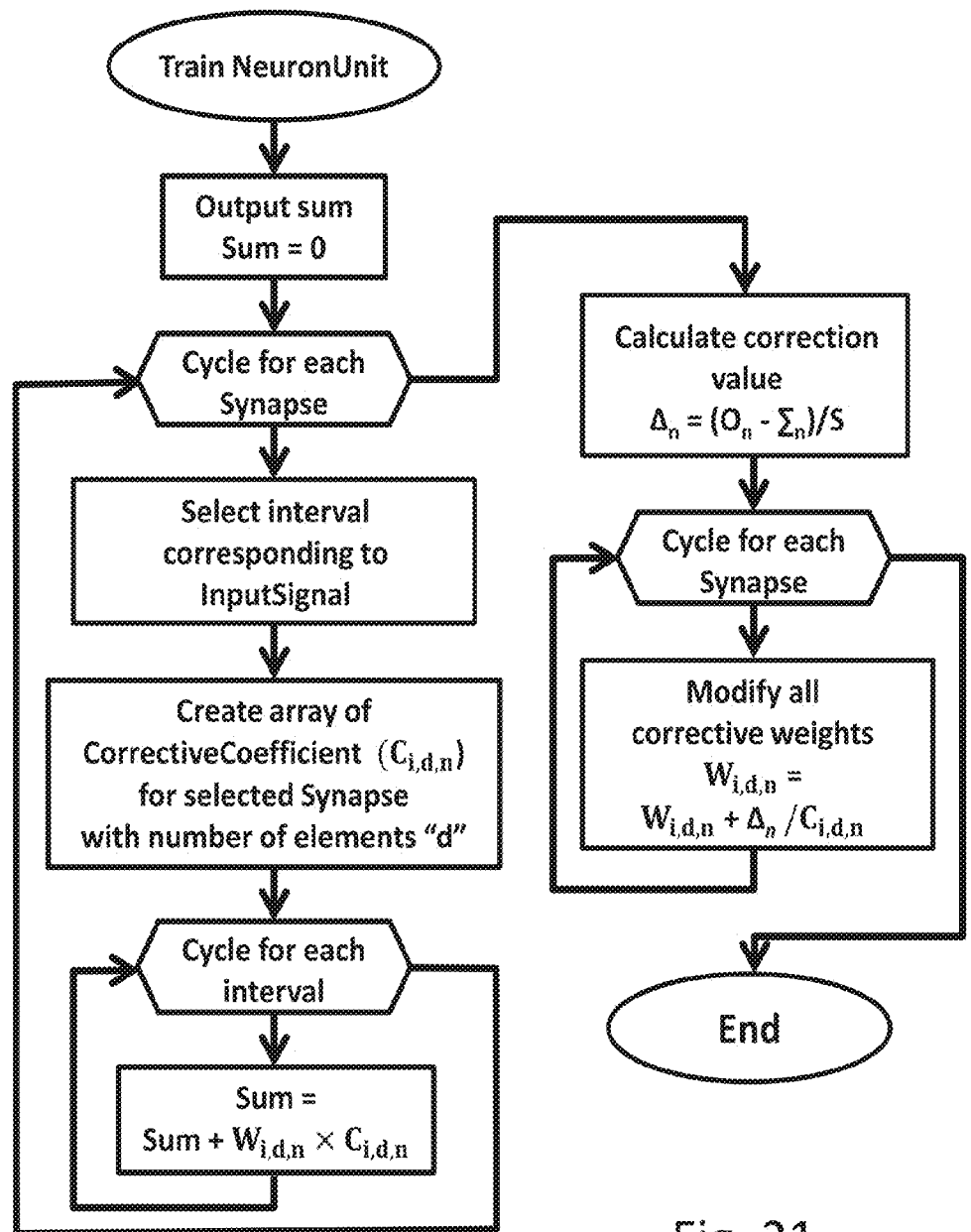
FIG. 21 is a schematic illustration of neuron unit training in the p-net shown in FIG. 2.

In the p-net 100, after a single cycle of training with the described-above algorithm, desired output images can be generated with small output sum variation, which can slow down the training process and can also reduce its accuracy. To improve training of the p-net 100, the initial variation of points can be artificially increased or extended, so that the variation of the magnitude of the points would cover the entire range of possible output values, for example −50 to +50, as shown in FIG. 21. Such an extension of the initial variation of points may be either linear or nonlinear.

A situation may develop where the maximum value of a certain output is an outlier or a mistake, for example, a manifestation of noise. Such can be manifested by the appearance of a maximum value surrounded by a multitude of small signals. When winning outputs are selected, the small signal values can be disregarded through selection the greatest signals surrounded by other large signals as the winners. For this purpose, known statistical techniques of variance reduction may be used, such as importance sampling. Such an approach can permit removing noise while maintaining basic valuable patterns. Creation of winner groups enables clustering of linearly inseparable images, i.e., images that relate to more than one cluster, as shown in FIG. 13. The above can provide a significant improvement in accuracy and decrease the number of clustering errors.

In the process of p-net 100 training, typical errors being subjected to correction are:

| Typical error of neural network | Method of p-net 100 correction |
|---|---|
| Errors in selection of training images. For example, the set of human images includes an image of a cat | Erasing the corresponding desired output image or restriction of its demonstration |
| Network errors that were not corrected during training. For example, a certain image is recognized incorrectly because the network cannot divide some features of the object (the effect of linear inseparability). | Additional training of the p-net 100 after the error is detected; introduction of additional desired output image |
| Decline in accuracy due to reaching the limit of network information capacity | P-net 100 expansion |

Error correction is also possible with the help of the above-described algorithm in training with an outside trainer.

Hardware portion of the p-net 100 can be provided in a digital, analog or combined digital-analog microchip. A representative p-net 100 microchip can be employed for both storage and processing of information. The p-net 100 microchip can be based on various variable resistors, field-effect transistors, memristors, capacitors, switching elements, voltage generators, non-linear photo-cells, etc. Variable resistors can be used as synaptic weights 108 and/or corrective weights 112. A plurality of such resistors can be connected in parallel, series, or series-parallel. In case of parallel connection of respective resistors, signals can be coded by current values, which can in turn facilitate automated analog summation of the currents. In order to obtain positive or negative signals, two sets of resistors, excitatory and inhibitory, may be provided on each synapse. In such a hardware structure inhibitory signals can be subtracted from excitatory signals.

Each corrective weight 112 can be implemented as a memristor-like device (memristor). As understood by those skilled in the art, a memristor is a variable resistor with resistance controlled by an electrical current in a circuit, or by an electrical potential or an electric charge. Appropriate memristor functionality can be achieved via an actual memristor device, software or physical emulation thereof. In operation of the p-net 100 at low voltage potential, memristor can operate as a simple resistor. During training mode, the resistance of the memristor can be varied, for example, by a strong voltage pulse. Whether the change of the memristor's value (increasing or decreasing of the resistance) can depend on the polarity of the voltage, while the magnitude of the value change can depend on the magnitude of voltage pulse.

Figure 24:
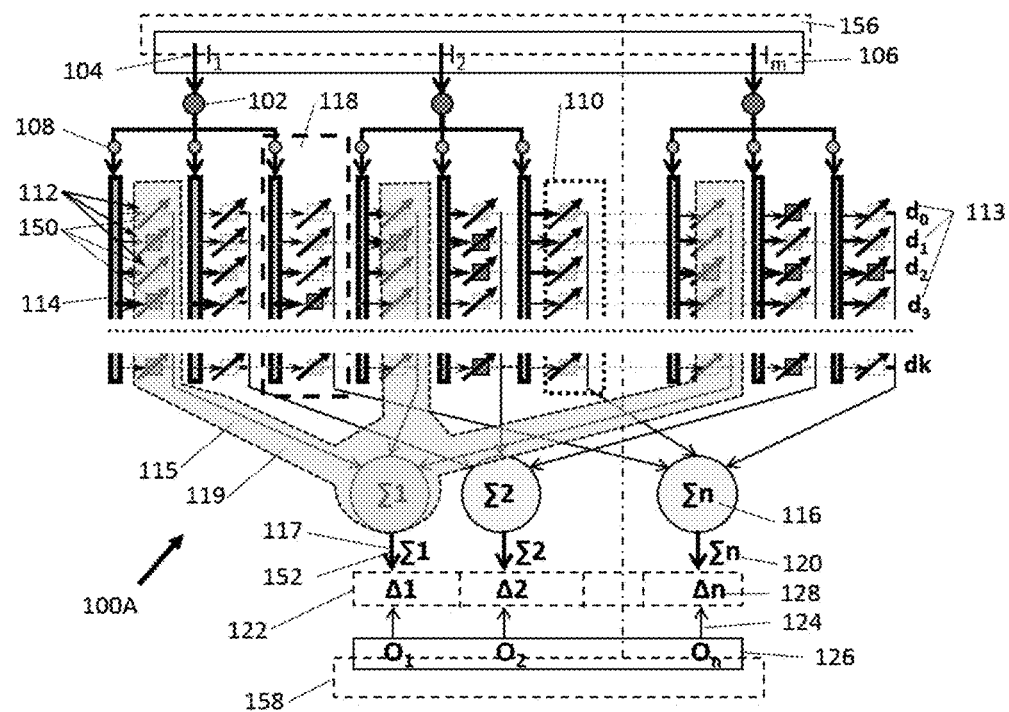
FIG. 24 is a schematic illustration of a specific embodiment of the p-net having each of the plurality of corrective weights established by a memory element; the p-net being depicted in the process of network training.

FIG. 24 illustrates an embodiment of the p-net 100 labeled as p-net 100A, which is similar in all ways to the previously described p-net 100, other than having specific elements that will be discussed below. In the p-net 100A each corrective weight 112 is established by a memory element 150 that retains the respective weight value of the particular corrective weight. In the p-net 100A, the weight correction calculator 122 can be configured to modify the respective corrective weight values of the corrective weights 112 being established by the corresponding memory elements 150. Consistent with other embodiments of the p-net 100A, the corrective weights 112 are established in the corresponding memory elements 150 using the determined deviation 128. During operation of the p-net 100A shown in FIG. 25, each respective output 117 of every neuron 116 provides the respective neuron sum 120 to establish an operational output signal 152 of the p-net 100A. The operational output signal 152 has a signal value the represents either a portion or the entirety of an operational output image 154.

During training of the p-net 100A, the weight correction calculator 122 can receive the desired output signal 124 representing a portion or the entirety of the output image 126, determine the deviation 128 of the neuron sum 120 from the value of the desired output signal 124, and modify respective corrective weight values established by the corresponding memory elements using the determined deviation. Furthermore, adding up the modified corrective weight values of the corrective weights 112 established by the corresponding memory elements 150 to determine the neuron sum will minimize the deviation of the neuron sum 120 from the desired output signal value 124. Minimizing the deviation of the neuron sum 120 from the desired output signal value 124 is used to train the p-net 100A.

As shown in phantom in FIG. 24, the trained p-net 100A of any disclosed embodiments can be configured to receive supplementary training using solely a supplementary input signal 156 having a value along with a corresponding supplementary desired output signal 158. In other words, the previously trained p-net 100A can receive supplementary training without being retrained with some or all of the original input signals 104 and desired output signals 124 that were employed to initially train the p-net 100A. Each of the plurality of synapses 118 in the p-net 100A can be configured to accept one or more additional corrective weights 112 that were established by the respective memory elements 150. Such additional corrective weights 112 can be added to the synapses either during training or before the supplementary training of the p-net 100A. Such additional corrective weights 112 can be used to expand a number of memory elements 150 available to train and operate the p-net 100A.

The p-net 100A can also be configured to remove from the respective synapses 118, either during or after training of the p-net 100A, one or more corrective weights 112 established by the respective memory elements 150. The removal of some corrective weights 112 can permit the neural network to retain only a number of memory elements required to operate the neural network. Such ability to remove corrective weights 112 is intended to make the p-net more compact, and thus more efficient for training and subsequent operation. The p-net 100A can also be configured to accept additional inputs 102, additional neurons 116, along with respective additional neuron outputs 117, and additional synapses 118, either before or during training of the p-net, to thereby expand the p-net's operational parameters. Such additions to the p-net 100A can enhance capability, such as capacity, precision of output, and a number of tasks that can be handled by the p-net.

The p-net 100A can be additionally configured to remove any number of unused inputs 102, neurons 116, along with respective additional neuron outputs 117, and synapses 118 before, during, or after either initial training or supplementary training, of the p-net. Such ability to remove elements of the p-net 100A that are not being used is intended to simplify structure and modify operational parameters of the p-net, i.e., condense the p-net, without loss of the p-net's output quality.

Figure 26:
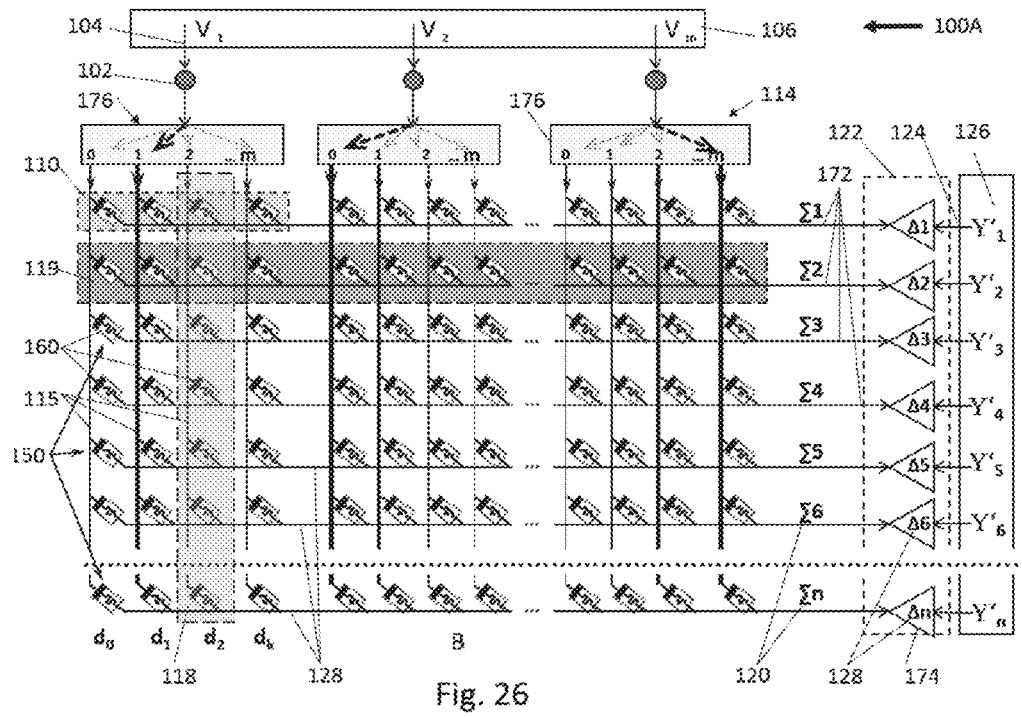
FIG. 26 is a schematic illustration of a representative p-net using memristors during a first stage of training.

As shown in FIG. 26, each memory element 150 can be established by an electrical component or device 160 characterized by an electrical and/or magnetic characteristic configured to define the weight value of the respective corrective weight 112, such as resistance, impedance, capacity, magnetic field, induction, or electric field intensity. Such an electrical device 160 can, for example, be configured as a memristor (shown in FIGS. 26-28), a resistor (shown in FIGS. 29-32), a transistor, a capacitor (shown in FIGS. 29-32), a field-effect transistor, a photoresistor or light-dependent resistor (LDR), a magnetic dependent resistor (MDR), or a memistor. As understood by those skilled in the art, a memistor is a resistor with memory able to perform logic operations and store information, and is a generally a three-terminal implementation of the memristor.

In such an embodiment of the memory element 150, the respective electrical and/or magnetic characteristic of each electrical device 160 can be configured to be varied during training of the p-net 100A. Additionally, in the p-net 100A using the electrical device 160 embodiment of the memory element 150, the weight correction calculator 122 can modify the values of the respective corrective weights 112 by varying the respective electrical and/or magnetic characteristic of the corresponding devices employed by the p-net 100A. Each electrical device 160 can also be configured to maintain or retain the electrical and/or magnetic characteristic that corresponds to the value of the respective corrective weight 112 modified during training of the p-net 100A, as discussed above, and used during operation of the p-net after the training.

Figure 27:
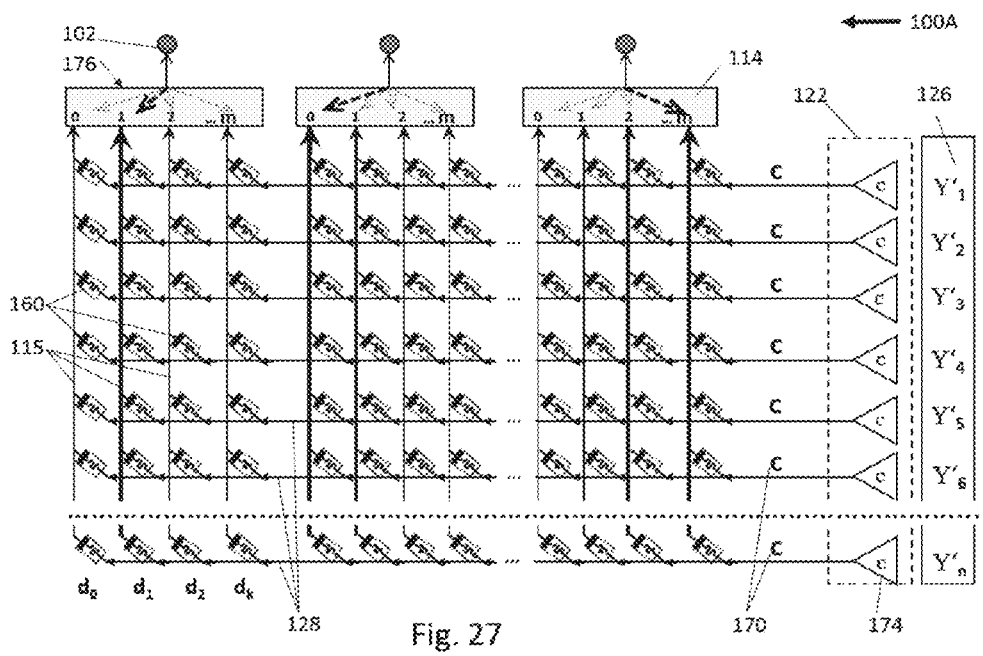
FIG. 27 is a schematic illustration of the representative p-net using memristors during a second stage of training.
Figure 28:
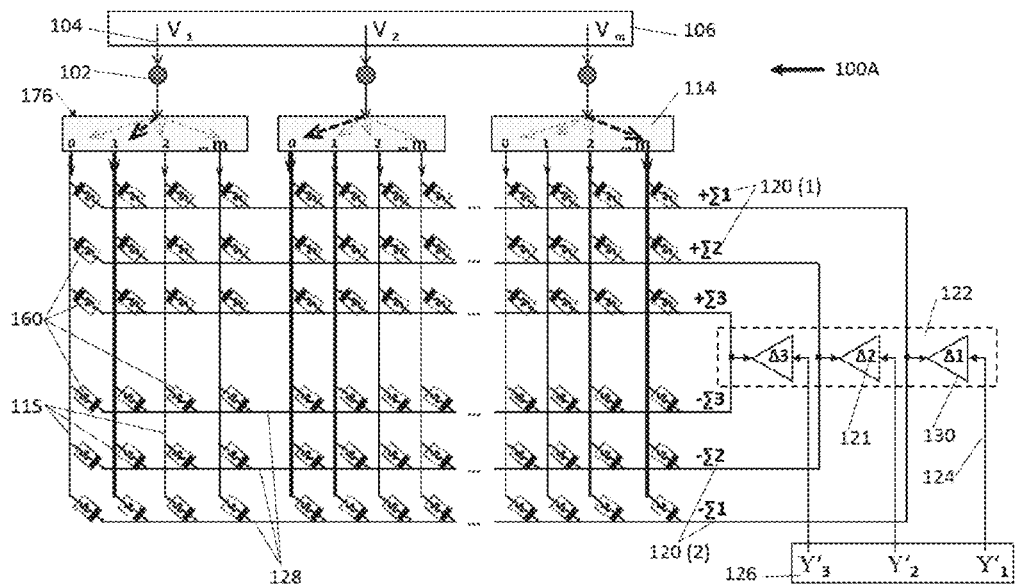
FIG. 28 is a schematic illustration of twin parallel branches of memristors in the representative p-net.
Figure 29:
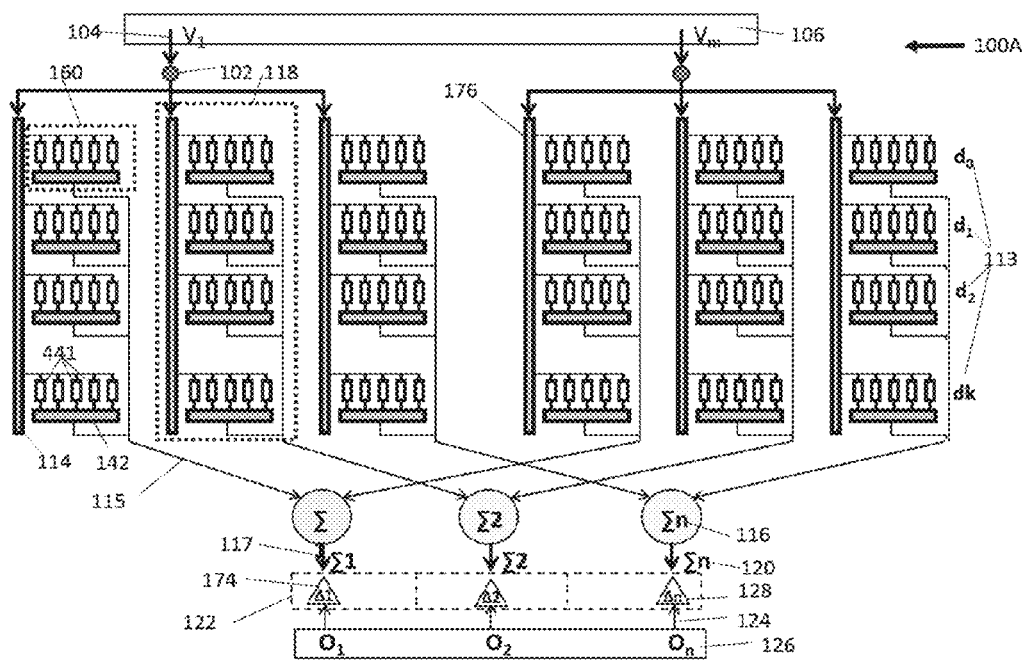
FIG. 29 is a schematic illustration of the representative p-net using resistors.
Figure 30:
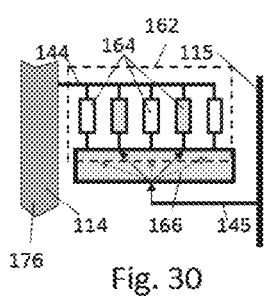
FIG. 30 is a schematic illustration of one embodiment of the memory element configured as a resistor in the p-net.
Figure 31:
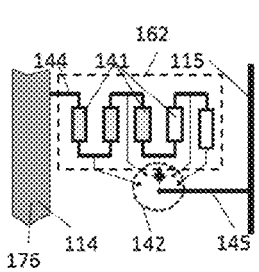
FIG. 31 is a schematic illustration of another embodiment of the memory element configured as a resistor in the p-net.

Specific embodiments of an appropriate memristor can be both the known physical expression of the device, as well as software or electrical circuit functional representations or equivalents thereof. FIGS. 26-28 depict embodiments of the representative p-net 100A employing such physical memristors. As shown in FIG. 26, each input 102 is configured to receive an analog input signal 104, wherein the input signals from an external source, such as an image sensor, arrays of light-sensitive elements or microphones, a digital-to-analog converter, etc. are represented as voltages V1, V2 . . . Vm. All the input signals 104 together generally describe the corresponding input image 106.

Each memory element 150 can also be established by a block 162 having electrical resistors 164. Such a block 162 with electrical resistors 164 can include a selector device 166. The selector device 166 is configured to select one or more electrical resistors 164 from the block 162 using the determined deviation 128 of the neuron sum 120 from the value of the desired output signal 124 to establish each corrective weight 112, as discussed above. Furthermore, each memory element 150 established by the block 162 having electrical resistors 164 can also include electrical capacitors 168. In other words, each memory element 150 can be established by the block 162 having electrical resistors 164, as well as electrical capacitors 168. In such a case, the selector device 166 can be additionally configured to select capacitors 168, as well as electrical resistors 164, using the determined deviation 128 to establish each corrective weight 112.

Figure 25:
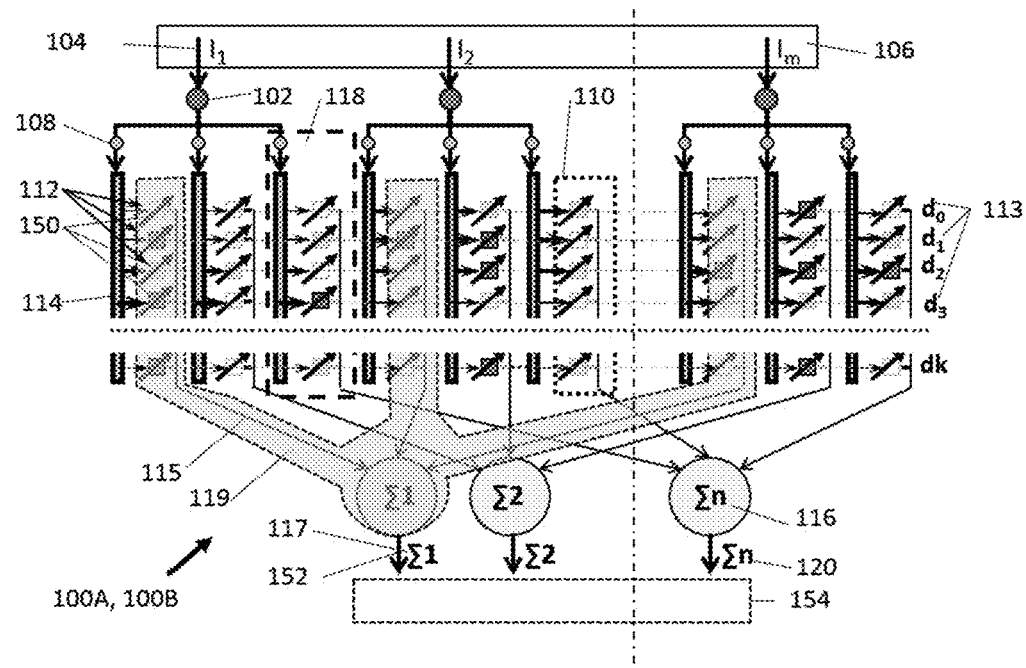
FIG. 25 is a schematic illustration of a specific embodiment of the p-net having each of the plurality of corrective weights established by the memory element; the p-net being depicted in the process of image recognition.

Each of the embodiments of the p-net 100A shown in FIGS. 24 and 25 can be configured as either an analog, digital, and digital-analog neural network. In such an embodiment of the p-net 100A, any of the plurality of inputs 102, plurality of synapses 118, memory elements 150, set of distributors 114, set of neurons 116, weight correction calculator 122, and desired output signals 124 can be configured to operate in an analog, digital, and digital-analog format. FIG. 26 illustrates the p-net 100A in the first stage of training which concludes with determination of the deviation 128 of the neuron sum 120 from the value of the desired output signal 124, while FIG. 27 illustrates the p-net 100A in the second stage of training concludes with formation of corrective signals 170 for the corrective weights 112 established by the electrical devices 160. As shown in FIG. 26, each synapse 118 is connected to one of the plurality of inputs 102, includes a plurality of electrical devices 160, shown as memristors, that function as corrective weights 112. Each corrective weight 112 is defined by a value of electrical resistance.

Figure 32:
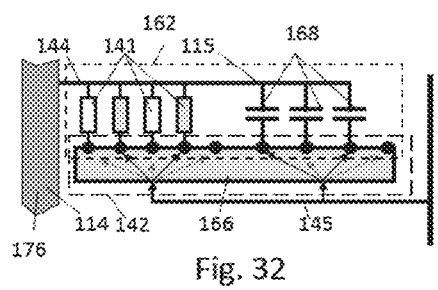
FIG. 32 is a schematic illustration of another embodiment of the memory element configured as variable impedance in the p-net.

The p-net 100A shown in FIG. 26 also includes a set of distributors 114. Each distributor 114 is operatively connected to one of the plurality of inputs 102 for receiving the respective input signal 104 via a set of electrical devices 160, configured as memristors, establishing the appropriate corrective weight 112. Additionally, each distributor 114 is configured to select one or more corrective weights 112 embodied by the memristors from the available plurality of corrective weights in correlation with the input voltage. FIG. 28 illustrates the p-net 100A using the electrical devices 160 configured as memristors arranged in a twin parallel branches. With respect to other solutions for the construction of the p-net 100A noted above, FIGS. 29-31 illustrate electrical devices 160 configured as common resistors to define appropriate resistances in the p-net 100A; while FIG. 32 illustrates electrical devices 160 configured to define impedances in the p-net 100A.

In the p-net 100A configured as an analog or analog-digital network, each input 102 is configured to receive an analog or digital input signal 104, wherein the input signals are represented as $I_1, I_2 \ldots I_m$ in FIGS. 24 and 25. Each input signal $I_1, I_2 \ldots I_m$ represents a value of some analog characteristic(s) of an input image 106, for example, a magnitude, frequency, phase, signal polarization angle, etc. In the analog p-net 100A, each input signal 104 has an input analog value, wherein together the plurality of input signals 104 generally describes the analog input image 106. In the p-net 100A configured as an analog network, each neuron 116 can be established by either a series or a parallel communication channel 172, for example, an electrical wire, or a series or a parallel bus. A representative bus embodiment of the communication channel 172 can use both parallel and bit serial connections, as understood by those skilled in the art. For example, if the corresponding analog signals are provided via electrical current, the communication channel 172 can be series current bus, while if the corresponding analog signals are provided via electrical potential on the respective corrective weights 112, a representative communication channel can be a parallel bus.

Analog embodiments of the corrective weight 112 are shown in FIGS. 26-32. Each analog corrective weight 112 is defined by the memory element 150 that retains the respective weight value of the particular corrective weight and acts on and modifies the forward signals Î (from input to output) or reverse signals Ǐ (from output to input), or an additional control signal, that flow therethrough. Furthermore, each analog corrective weight 112 can retain its respective weight value during actual operation of the p-net 100A, for example, during image recognition. Additionally, the value of each analog corrective weight 112 can be modified either via the forward signals Î or via the reverse signals Ǐ, or an additional control signal, during training of the p-net 100A. As a result, an analog embodiment of the p-net 100A can enable generation of microchips permitting support of various computer applications. Moreover, the entire p-net 100A can be programmed into an electronic device having a memory, such as a microchip, video card, etc. Accordingly, an appropriate embodiment of each memory element 150 will then also be stored in the memory of the subject electronic device.

Consistent with the above, each electrical device 160 in the analog p-net 100A can be configured to restore the electrical and/or magnetic characteristic corresponding to the modified value of the respective corrective weight 112 following the training of the p-net. The weight correction calculator 122 can be configured to generate one or more correction signals representative of the determined deviation 128 of the neuron sum 120 from the value of the desired output signal 124. Furthermore, each of the generated correction signals can be used to vary the electrical and/or magnetic characteristic of at least one electrical device, 160 i.e., separate correction signals used for each device being modified. The weight correction calculator 122 can also be configured to generate a single correction signal used to vary the electrical and/or magnetic characteristic of each electrical device 160, i.e., one correction signal can be used for all electrical devices being modified.

Specific embodiments of the weight correction calculator 122 can be embedded into the p-net 100A as programmed software or be established via external devices or accessible computer programs. For example, the weight correction calculator 122 can be established as a set of differential amplifiers 174. Consistent with the overall disclosure, each such differential amplifier 174 can be configured to generate a respective correction signal representative of the determined deviation 128 of the neuron sum 120 from the value of the desired output signal 124. Each electrical device 160 can be configured to maintain the electrical and/or magnetic characteristic corresponding to the modified value of the respective corrective weight 112 after training of the p-net 100A is completed. The p-net 100A can also be configured to use the maintained electrical and/or magnetic characteristic during the p-net's operation, i.e., after the training has been completed. Such structure of the p-net 100A facilitates parallel or batch training of the corrective weights 112 and thereby permits a significant reduction in the amount of time required to train the p-net, as compared with traditional neural networks described above.

Each distributor 114 in the p-net 100A can be configured as a either an analog, digital, or analog-digital device that takes a single input signal 104 and selects one or more of multiple data-output-lines, which is connected to the single input, i.e., a demultiplexer 176. Such a demultiplexer 176 can be configured to select one or more corrective weights 112 from the plurality of corrective weights in response to the received input signal 104. Each distributor 114 can be configured to convert the received input signal 104 into a binary code and select one or more corrective weights 112 from the plurality of corrective weights in correlation with the binary code.

Figure 33:
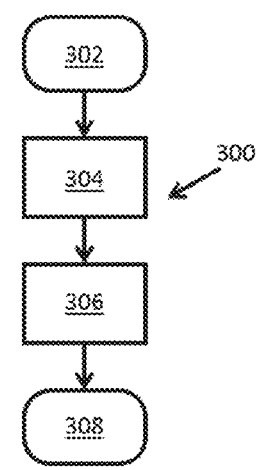
FIG. 33 is a flow diagram of a method used to operate the neural network shown in FIGS. 2-22 and 24-32.

FIG. 33 depicts a method 300 of operating a utility neural network 100B (shown in FIG. 25). The method 300 operates in accordance with the above disclosure with respect to FIGS. 2-22 and 24-32. The method 300 commences in frame 302 where the method includes providing the utility neural network 100B. Following frame 302 the method advances to frame 304. In frame 304 the method includes processing data via the utility neural network 100B using modified values of the corrective weights 112 established by a separate analogous neural network, such as the p-net 100A, during training thereof. The training of the analogous p-net 100A can include supplementary training, as described above with respect to FIG. 24.

The utility neural network 100B and the trained separate p-net 100A can be made analogous by having a matching neural network structure, for example, as represented in FIG. 25, such that the utility neural network 100B can exclude the weight correction calculator 122 and the corresponding ability to train the utility neural network. Accordingly, the matching neural network structure can include an identical number of inputs 102, corrective weights 112, distributors 114, neurons 116, neuron outputs 117, and synapses 118. In other words, the p-net 100A and the utility neural network 100B can be substantially identical with respect to all the features establishing the networks' operating parameters, with the largest functional difference being the ability of the p-net 100A to be trained by establishing the modified corrective weights 112. Each of the analogous p-net 100A and the utility neural network 100B can be implemented in distinct configurations, for example, in various forms of hardware and/or software, as well as in analog and/or digital format, thereby permitting the utility neural network and the analogous p-net to be represented by dissimilar carriers. In such a case, a translator (not shown) may be employed to convert or interpret the data with the modified corrective weights 112.

In each of the utility neural network 100B and the trained separate p-net 100A, each corrective weight 112 can be established by the memory element 150. Specifically, in the p-net 100A, the memory element 150 can retain the respective modified weight value corresponding to the corrective weight 112 following the training of the p-net. Each input image 106 provided to the utility neural network 100B can be represented by the combined input signals 104 represented by $I_1, I_2 \ldots I_m$, identical to the description with respect to FIG. 2. As additionally discussed with respect to FIG. 2, each input signal $I_1, I_2 \ldots I_m$ represents a value of some characteristic(s) of the corresponding input image 106.

From frame 304 the method proceeds to frame 306. In frame 306 the method includes establishing an operational output signal 152 using the modified corrective weights 112, as discussed with respect to FIG. 25. Accordingly, the processing of the input data, such as the input image 106, via the utility neural network 100B can culminate with recognition of such data and as the operational output signal 152 of the utility neural network. The operational output signal 152 of the utility neural network 100B can then be interpreted or decoded either by the utility network itself or by an operator of the utility network as part of frame 308 to complete the method. The establishment of the modified corrective weights 112 in the p-net 100A can be accomplished according to the method 200 of training the p-net 100, as described with respect to FIG. 23.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A neural network comprising:
   a plurality of inputs of the neural network, each input configured to receive an input signal having an input value;
   a plurality of synapses, wherein each synapse is connected to one of the plurality of inputs and includes a plurality of corrective weights, wherein each corrective weight is established by a memory element that retains a respective weight value;
   a set of distributors, wherein each distributor is operatively connected to one of the plurality of inputs for receiving the respective input signal and is configured to select one or more corrective weights from the plurality of corrective weights in correlation with the input value; and
   a set of neurons, wherein:
      each neuron has at least one output and is connected with at least one of the plurality of inputs via one of the plurality of synapses;
      each neuron is configured to add up the weight values of the corrective weights selected from each synapse connected to the respective neuron and thereby generate a neuron sum; and
      the output of each neuron provides the respective neuron sum to establish an operational output signal of the neural network.

2. The neural network of claim 1, further comprising a weight correction calculator configured to receive a desired output signal having a value, determine a deviation of the neuron sum from the desired output signal value, and modify respective corrective weight values established by the corresponding memory elements using the determined deviation, such that adding up the modified corrective weight values to determine the neuron sum minimizes the deviation of the neuron sum from the desired output signal value to thereby generate a trained neural network.

3. The neural network of claim 2, wherein the trained neural network is configured to receive supplementary training using solely a supplementary input signal having a value and a corresponding supplementary desired output signal.

4. The neural network of claim 3, wherein, during training or before the supplementary training of the neural network, each of the plurality of synapses is configured to accept one or more additional corrective weights established by the respective memory elements.

5. The neural network of claim 2, wherein the neural network is configured to remove from the respective synapses, during or after training of the neural network, one or more corrective weights established by the respective memory elements to retain only a number of memory elements required to operate the neural network.

6. The neural network of claim 2, wherein the neural network is configured to accept at least one of an additional input, an additional synapse, and an additional neuron before or during training of the neural network to thereby expand operational parameters of the neural network.

7. The neural network of claim 2, wherein the neural network is configured to remove at least one of an input, a synapse, and a neuron that is not being used by the neural network before, during, or after training of the neural network to thereby simplify a structure of the neural network and modify operational parameters of the neural network.

8. The neural network of claim 2, wherein each memory element is established by an electrical device characterized by at least one of an electrical and a magnetic characteristic configured to define a respective weight value wherein the respective at least one of the electrical and the magnetic characteristic of each electrical device is configured to be varied during training of the neural network, and wherein the weight correction calculator modifies the respective corrective weight values by varying the respective at least one of the electrical and the magnetic characteristic of the corresponding electrical devices.

9. The neural network of claim 8, wherein the electrical device is configured as one of a resistor, a memistor, a memristor, a transistor, a capacitor, a field-effect transistor, a photoresistor, or a magnetic dependent resistor.

10. The neural network of claim 2, wherein each memory element is established by a block of electrical resistors and includes a selector device configured to select one or more electrical resistors from the block using the determined deviation to establish each corrective weight.

11. The neural network of claim 10, wherein each memory element is additionally established by a block of electrical capacitors, and wherein the selector device is additionally configured to select capacitors using the determined deviation to establish each corrective weight.

12. The neural network of claim 2, wherein the neural network is configured as one of an analog, digital, and digital-analog network, such that at least one of the plurality of inputs, the plurality of synapses, the memory elements, the set of distributors, the set of neurons, the weight correction calculator, and the desired output signal is configured to operate in an analog, digital, and digital-analog format.

13. The neural network of claim 12, wherein the neural network is configured as the analog network, and wherein each neuron is established by one of a series and a parallel communication channel.

14. The neural network of claim 2, wherein the weight correction calculator is established as a set of differential amplifiers, and wherein each differential amplifier is configured to generate a respective correction signal.

15. The neural network of claim 1, wherein each of the distributors is a demultiplexer configured to select one or more corrective weights from the plurality of corrective weights in response to the received input signal.

16. The neural network of claim 1, wherein each distributor is configured to convert the received input signal into a binary code and select one or more corrective weights from the plurality of corrective weights in correlation with the binary code.

17. The neural network of claim 1, wherein the neural network is programmed into an electronic device having a memory, and wherein each memory element is stored in the memory of the electronic device.

18. A method of operating a utility neural network, the method comprising:

processing data via the utility neural network using modified corrective weight values established by a separate analogous neural network during training thereof; and establishing an operational output signal of the utility neural network using the modified corrective weight values established by the separate analogous neural network;

wherein the separate analogous neural network was trained via:

receiving, via an input to the neural network, a training input signal having a training input value;

communicating the training input signal to a distributor operatively connected to the input;

selecting, via the distributor, in correlation with the training input value, one or more corrective weights from a plurality of corrective weights, wherein each corrective weight is defined by a weight value and is positioned on a synapse connected to the input;

adding up the weight values of the selected corrective weights, via a neuron connected with the input via the synapse and having at least one output, to generate a neuron sum;

receiving, via a weight correction calculator, a desired output signal having a value;

determining, via the weight correction calculator, a deviation of the neuron sum from the desired output signal value; and modifying, via the weight correction calculator, respective corrective weight values using the determined deviation to establish the modified corrective weight values, such that adding up the modified corrective weight values to determine the neuron sum minimizes the deviation of the neuron sum from the desired output signal value to thereby train the neural network.

19. The method according to claim 18, wherein the utility neural network and the trained separate neural network include a matching neural network structure including a number of inputs, corrective weights, distributors, neurons, and synapses.

20. The method according to claim 18, wherein, in each of the utility neural network and the trained separate neural network, each corrective weight is established by a memory element that retains a respective weight value, and wherein in the separate neural network the memory element retains its respective weight value following training.

* * * * *